United States Patent
Ramaswamy et al.

(10) Patent No.: US 11,425,100 B2
(45) Date of Patent: Aug. 23, 2022

(54) OPTIMIZATION OF REDUNDANT USAGE PATTERNS BASED ON HISTORICAL DATA AND SECURITY CONSTRAINTS

(71) Applicant: Bank of America Corporation, Charlotte, NC (US)

(72) Inventors: Varadharajan Candhadai Ramaswamy, Irving, TX (US); Michael Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 241 days.

(21) Appl. No.: 16/930,555

(22) Filed: Jul. 16, 2020

(65) Prior Publication Data
US 2022/0021655 A1 Jan. 20, 2022

(51) Int. Cl.
*H04L 9/40* (2022.01)
*H04L 41/5006* (2022.01)

(52) U.S. Cl.
CPC ...... *H04L 63/0281* (2013.01); *H04L 41/5006* (2013.01); *H04L 63/1425* (2013.01); *H04L 63/1491* (2013.01)

(58) Field of Classification Search
CPC ............. H04L 63/0281; H04L 41/5006; H04L 63/1425; H04L 63/1491; H04L 63/0428; G06F 21/64; H04W 12/35
See application file for complete search history.

(56) References Cited

U.S. PATENT DOCUMENTS

| 7,178,051 | B2 | 2/2007 | Barr et al. |
| 7,191,356 | B2 | 3/2007 | Barr et al. |
| 7,237,138 | B2 | 6/2007 | Greenwald et al. |
| 7,602,704 | B2 | 10/2009 | Shaffer et al. |
| 9,122,595 | B2 | 9/2015 | Parra et al. |

(Continued)

OTHER PUBLICATIONS

Sun et al., "RPAD: An Unsupervised HTTP Request Parameter Anomaly Detection Method," 2020 IEEE 19th International Conference on Trust, Security and Privacy in Computing and Communications (TrustCom).*

(Continued)

*Primary Examiner* — Roderick Tolentino
(74) *Attorney, Agent, or Firm* — Weiss & Arons LLP

(57) ABSTRACT

Typically, a business desires to track and monitor all applications run on its servers. Nonetheless, one or more unauthorized applications may be running on the business's servers, exposing the business to potential regulatory liability and security breaches. Apparatus and methods are provided for isolating and disabling one or more unauthorized applications running on a server. The apparatus may comprise a system including a content-filtering web proxy server configured to filter outgoing requests and data associated with the requests. The system may also include a remediation framework configured to monitor request data in a proxy log stored by the proxy server. The remediation framework may be triggered to perform remedial action when the remediation framework determines that a request and associated data, as stored in the proxy log, meets predetermined conditions. The remediation framework, when triggered, may execute steps to truncate functionality of the unauthorized applications.

20 Claims, 11 Drawing Sheets

(56) References Cited

U.S. PATENT DOCUMENTS

| | | | |
|---|---|---|---|
| 9,488,689 | B2 | 11/2016 | Dougherty |
| 9,824,000 | B1 | 11/2017 | Babcock |
| 9,842,045 | B2 | 12/2017 | Heorhiadi et al. |
| 9,934,105 | B2 | 4/2018 | Parra et al. |
| 10,162,708 | B2 | 12/2018 | Parra et al. |
| 10,255,129 | B2 | 4/2019 | Jiang et al. |
| 10,680,913 | B1 | 6/2020 | Achi Vasudevan et al. |
| 2004/0133478 | A1 | 7/2004 | Leahy et al. |
| 2005/0028010 | A1* | 2/2005 | Wallman ............ H04L 63/1458 726/4 |
| 2008/0065746 | A1* | 3/2008 | Moghaddam ......... H04W 12/08 709/220 |
| 2013/0104236 | A1* | 4/2013 | Ray ..................... H04L 63/1408 726/25 |
| 2014/0283069 | A1* | 9/2014 | Call ...................... G06F 21/566 726/23 |
| 2015/0033086 | A1* | 1/2015 | Sasturkar ............ H04L 41/0631 714/57 |
| 2016/0014084 | A1 | 1/2016 | Hansen |
| 2016/0094569 | A1* | 3/2016 | Mondiguing ....... H04L 63/1416 726/24 |
| 2016/0149776 | A1* | 5/2016 | Pani .................... H04L 63/1416 709/224 |
| 2016/0219065 | A1* | 7/2016 | Dasgupta ............ H04L 63/1441 |
| 2016/0371489 | A1* | 12/2016 | Puri ...................... G06F 16/254 |
| 2017/0099292 | A1 | 4/2017 | Kelley et al. |
| 2018/0203751 | A1* | 7/2018 | Lee ....................... G06F 11/079 |
| 2018/0288091 | A1 | 10/2018 | Doron et al. |
| 2019/0171552 | A1 | 6/2019 | Mitchell et al. |
| 2019/0207772 | A1 | 7/2019 | Hecht et al. |
| 2020/0285464 | A1 | 9/2020 | Brebner |
| 2021/0034031 | A1* | 2/2021 | Acharya ............ G05B 19/4184 |
| 2021/0349705 | A1* | 11/2021 | Sasson .................. G06F 3/0607 |
| 2022/0006786 | A1* | 1/2022 | Ogrinz .................... H04L 67/02 |

OTHER PUBLICATIONS

Borge et al., "On the Application Level Impact of SSD Performance Anomalies," 2020 IEEE International Symposium on Performance Analysis of Systems and Software (ISPASS) Year: 2020 | Conference Paper | Publisher: IEEE.*

Aghera, P. et al., "An Approach to Build Multi-Tenant SaaS Application with Monitoring and SLA," 2012 International Conference on Communication Systems and Network Technologies: 658-661. (Year: 2012).

* cited by examiner

TOP APIS

Show [10 ▼] entries   707   709   711   [30 Days ▼] Show interna 713

Search: [_____]

| Host ◀ | Category | URL | Total Bytes in ▼ | Total Bytes Out |
|---|---|---|---|---|
| 55 | Finance News | api.morningstar.com | 38,436.09 MB | 4,553.44 MB |
| 4 | Business/Economy | api.pjm.com | 10,679.74 MB | 26.44 MB |
| 3 | Business/Economy | misapi.ercot.com | 8,479.74 MB | 7,658.7 MB |
| 10 | Technology/Internet | dev.virtualearth.net | 4,578.86 MB | 459.65 MB |
| 69 | Technology/Internet | api.devicecheck.apple.com | 4,382.58 MB | 57,341.13 MB |
| 4 | Business/Economy | api.misoenergy.org | 3,132.77 MB | 64.5 MB |
| 34 | Finance | api.donorfirstx.com | 1,153.58 MB | 416.09 MB |
| 1 | Technology/Internet | api.kennasecurity.com | 1,150.2 MB | 23.1 MB |
| 71 | Business/Economy; File Storage/Sharing | api.intralinks.com | 845.23 MB | 3.53 MB |
| 7 | Social Networking | api.twitter.com | 390.09 MB | 64.88 MB |

| Host | Score | User(s) | User Agents | Usage comments | MB received | Environment | MB sent | Internal Identification Number | App Owner |
|---|---|---|---|---|---|---|---|---|---|
| 805 | 807 | 809 | 811 | 813 | 815 | 817 | 819 | 821 |
| AID Online | | | | | | | | | |
| 209.67.48.4 | 5 | zs3fy8l | | | 74.74 MB | Production | 8.14 MB | 70680 | John Doe |
| 216.35.133.133 | 5 | zs3fy8l | | | 69.53 MB | Production | 7.96 MB | 70680 | Karew Way |
| 216.35.62.140 | 5 | zs3fy8l | | | 1,221.34 MB | Production | 128.73MB | 23168, 25872, 27814, 38764, 41788, 94173 | Anne Way, John Xie |

API STATS — API.MORNINGSTAR.COM
Show 10 entries  803
Search:  829

FIG. 8

OPTIMIZATION OF REDUNDANT USAGE PATTERNS BASED ON HISTORICAL DATA AND SECURITY CONSTRAINTS

FIELD OF TECHNOLOGY

Servers typically run one, two or more applications. To provide reliable operation of the server, technicians must ensure that each application run on the server complies with technical, regulatory and business requirements. Companies, therefore, typically invest considerable time and resources in technical support services to maintain the multiple applications supported by their software and running on their servers.

Despite a technician's best efforts, however, non-compliant applications may be found running on the company's servers. Such applications may not be pre-vetted by technicians maintaining the company's servers and may therefore not be registered in the company's central directory of known, vetted applications that comply with the company's security and technical requirements.

Such unauthorized applications, also known as "shadow IT", may be deployed on a company's servers without the company's awareness of their presence. These non-compliant applications may be deployed on a company's server by a programmer as a shortcut to circumvent governance controls, or with malicious intent to breach the company's security protocol. Unauthorized applications can cause multiple hardships to a company, including inability to provide proper oversight, exposure to liability for noncompliance with government or internal rules and regulations, security breaches and unreliable services. End-users of "shadow IT" applications may not realize they are unsupported and/or potentially unstable. This could lead to unplanned business interruptions or other consequences if the application has not been properly audited before deployment.

It would be desirable to provide apparatus and methods for isolating and disabling unauthorized applications to improve reliability and security of the company's computer servers and associated software applications. Accordingly, it would be desirable to provide apparatus and methods for OPTIMIZATION OF REDUNDANT USAGE PATTERNS BASED ON HISTORICAL DATA AND SECURITY CONSTRAINTS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 7 shows an illustrative graphical user interface in accordance with principles of the disclosure;

FIG. 8 shows an illustrative graphical user interface in accordance with principles of the disclosure;

DETAILED DESCRIPTION

Figure 1:
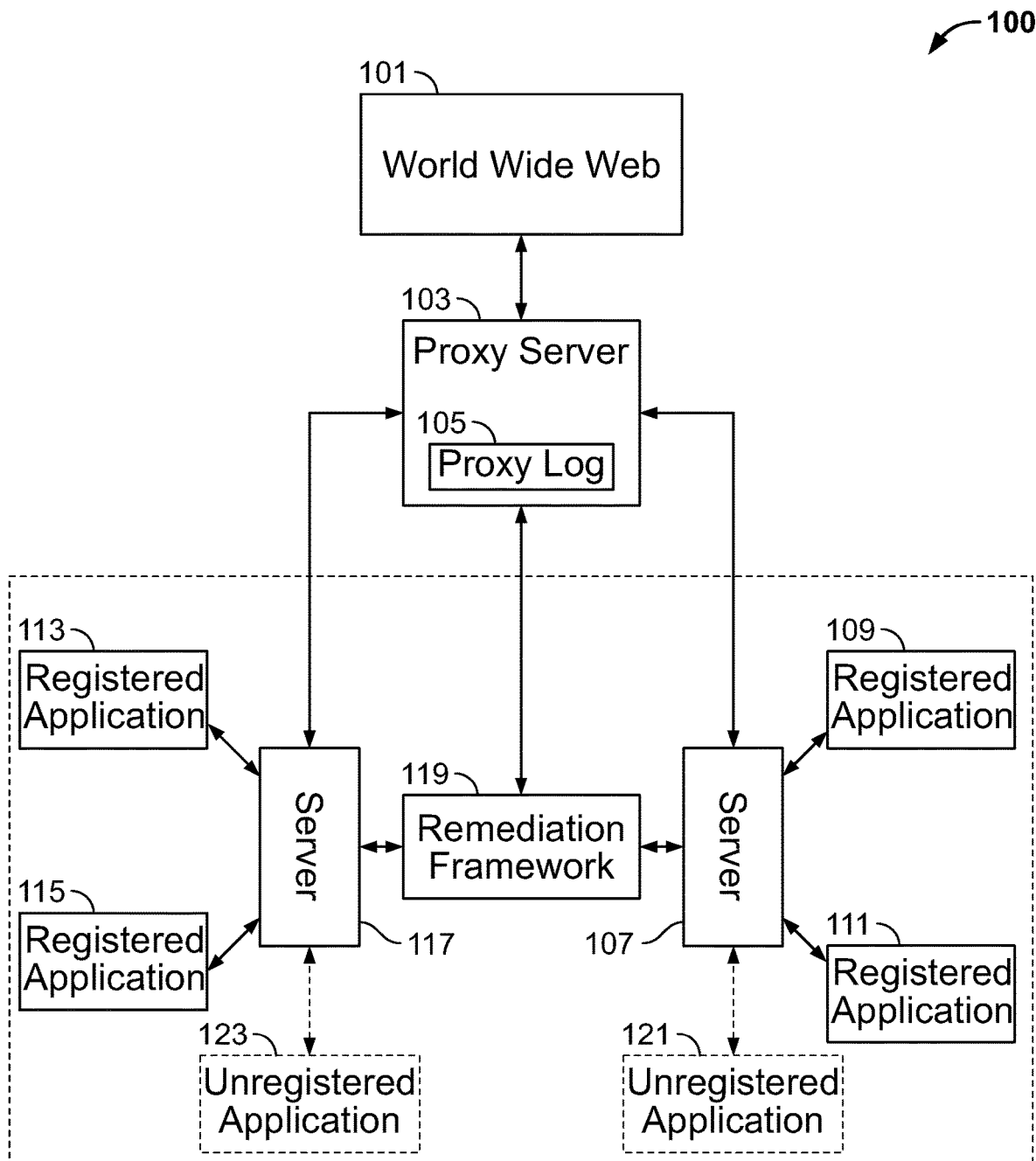
FIG. 1 shows illustrative system architecture in accordance with principles of the disclosure.

Apparatus and methods for isolating and disabling unauthorized applications is provided. The isolating may include quarantining the unauthorized applications. The disabling may include quarantining the unauthorized applications.

The apparatus may include a system. The system may identify and quarantine shadow information technology ("IT"). The shadow IT may comprise one or more unauthorized applications running on a server.

The system may include a proxy server. The proxy server may be a web proxy server. The proxy server may filter content passing through the proxy to and from the internet. The proxy server is referred to alternately herein as a content filtering web proxy server, however, it is to be understood that any suitable proxy server may be used.

The proxy server may be configured to filter requests and data associated with the requests. The requests may be outgoing requests. The requests may be calls. The requests may be received from one or more client servers. The requests may be received from one or more web browsers. The requests may be received from one or more applications. The requests may use the Hypertext Transfer Protocol ("HTTP"). The requests may use other stateless or stateful protocols, or a plurality of protocols. Although the requests are referred to alternately herein as 'HTTP requests', it is to be understood that any other suitable protocol may be used.

The proxy server may store, in the proxy log, the HTTP request and/or data associated with the HTTP request. Exemplary data that may be stored by the proxy log, and associated with a request, includes one or more of a data and time that the request was received, request method, such as HTTP request method, protocol version, such as HTTP protocol version, user agent, content type, requested resource, time needed to provide a reply, size of data transmitted by the request, and any other suitable data.

The proxy server may also store, in the proxy log, data associated with data packets being transmitted from the internet to a destination within a company's servers, the data including size of data transmitted, destination address, protocol version, and any other suitable data.

The system may include a remediation framework. The remediation framework may be configured to monitor data in the proxy log stored by the proxy server. The remediation framework may be triggered to perform remedial action. The remediation framework may be triggered when one or more conditions are satisfied by an HTTP request and/or data associated with the HTTP requests.

The remediation framework may monitor data stored by the proxy log to determine if the one or more conditions are satisfied. The remediation framework may monitor HTTP requests received by the proxy server. The requests may be HTTP requests received by the proxy server but not yet fired by the proxy server. The HTTP requests may be pending HTTP requests. The proxy server may put the HTTP requests on a temporary hold while the remediation framework is monitoring the HTTP requests.

The remediation framework may monitor a subset of HTTP requests received by the proxy server. The remediation framework may monitor all of the HTTP requests received by the proxy server. In some embodiments, the proxy server may put the HTTP request on a temporary hold while the HTTP request is being monitored by the remediation framework.

The remediation framework may periodically, continually or upon the lapse of a predetermined time period, monitor the data. The remediation framework may monitor data in the proxy log each time a new entry is created. The remediation framework may monitor data in the proxy log each time a new entry is updated. The monitoring may include assigning weights to a request when predefine condition(s) are satisfied.

The remediation framework may monitor data stored by the proxy log to identify requests originating from programs, on a company's servers, that are calling application programming interfaces ("APIs") on the internet. Once the request is determined to be calling an API, further analysis may be performed to determine if the call is being generated from an unregistered application. When it is determined that the call is being generated from an unregistered application, methods described below may be implemented to isolated and disable the unregistered application.

Additionally, a group of HTTP requests may be extracted from the proxy log. The requests in the group may all be outgoing HTTP requests. The HTTP requests in the group may be requests that have been identified as likely being a certain type of requests, such as an API call. The HTTP requests in the group may then be subdivided into one or more subgroups, each subgroup including requests that are calling IP addresses that include a similar term. The HTTP requests in each group may then, in some embodiments, be divided into a first group that will be allowed, by the proxy server, to be fired, and into a second group that will be re-directed by the proxy server. Systems and methods may therefore be used to consolidate network traffic including requests, such as API calls, from a large number of websites (i.e. IP addresses) that are each providing identical information to a smaller group of websites. The smaller group of websites may meet one or more conditions detailed below.

The remediation framework may extract from the proxy log a group of HTTP requests received by the proxy server. The extracting may be performed during the monitoring. The monitoring may include the extracting.

The remediation framework may review data stored by the proxy log to extract from the proxy log the group of HTTP requests. Each of the HTTP requests included in the group may be identified as satisfying one or more predetermined conditions.

In exemplary embodiments, each of the HTTP requests in the group may be HTTP requests for which the HTTP request, and associated data, as stored in the proxy log, satisfies one, two, three, four or all of the following conditions: the HTTP request includes predefined term (such as an IP address, included in the HTTP request, includes the predefined term); is identified as originating from a production server; is associated with an account ID that identifies a service account; is either associated with a user agent that identifies a program or is not associated with any user name; and is associated with an identification number that, in a central registry, identifies a production application.

The remediation framework may review data stored by the proxy log and/or data included in the group to identify an unregistered application running on a production server. An unregistered application is referred to alternately herein as an 'anomalous HTTP request'.

The remediation framework may identify an anomalous HTTP request by monitoring HTTP requests within the group.

The remediation framework may identify an anomalous HTTP request by monitoring HTTP requests stored in the proxy log.

The remediation framework may be triggered to perform remedial action on an unregistered application when an unregistered application is identified. An anomalous HTTP request may be an HTTP request for which weight(s) assigned to the HTTP request are above a threshold value. The assigning of weights to the request, which may include a first, second, third, fourth, fifth weight, and potentially a sixth, seventh and/or eight weight, is discussed in detail below.

In some embodiments, an anomalous HTTP request may be removed from the group. In some embodiments, an anomalous HTTP requests may not be removed from the group.

The remediation framework may not be triggered to perform remedial action for an HTTP request when it is determined that the request is being generated by an end user. For example, when the assigned weight is below a threshold value for a request, the remediation framework may terminate the review of the request and move on to the monitoring of a different request.

The remediation framework may identify an anomalous HTTP request by querying stored information associated with an HTTP request's identification number and determining that an IP address associated with the HTTP request is anomalous based on the stored information. An HTTP request may be tagged as anomalous in response to determining that an IP address associated with the request is anomalous based on stored data associated with the request's identification number.

The remediation framework may determine if the IP address is anomalous by querying stored information associated with the identification number. For example, the central registry may store data identifying one or more external APIs that a registered application associated with an identification number will access. When the central registry includes stored data identifying allowed external API calls for a registered application, the remediation framework may, for each HTTP request, access the central registry and filter all registered external APIs that are associated with the identification number. The filtering may be used by the remediation framework to determine whether or not to tag the IP address as anomalous. If the HTTP request is associated with a registered external API, the remediation framework may not tag the IP address as anomalous and terminate its review of the HTTP request. In some embodiments, the remediation framework may automatically block any traffic to an external API that is not pre-registered, in the central registry, as associated with the traffic's identification number.

In some embodiments, the remediation framework may tag the IP address as anomalous when the identification number is associated with registered external APIs and the HTTP request is not accessing one of the registered APIs. In some embodiments, when the identification number is not associated with any registered external APIs, the remediation framework may tag the IP address as anomalous.

In some embodiments, the remediation framework may store historical activity of HTTP requests generated by a server, and/or historical activity of an application identified by an identification number. The remediation framework may then compare a newly-generated HTTP request to the historical data to flag any new traffic that is different from the traffic stored in the historical activity. The remediation framework may tag the IP address as anomalous if the HTTP request is determined to be different from the historical HTTP requests associated with the identification number.

Tagging the IP address as anomalous may include tagging a term in the IP address as anomalous. For example, if the IP address includes one or more predetermined terms stored by the remediation framework, the remediation framework may tag the term in the IP address as anomalous. The predetermined terms may include terms identifying APIs that should not be accessed by production servers, such as, for example, 'YouTube', and one or more terms that indicate that the API is associated with inappropriate, violent, or otherwise undesirable subject matter.

The remediation framework, when it is determined that an HTTP request is anomalous, may send a notification to one or more e-mail addresses of technician(s) associated with the production server. Sending the notification to the technician may be performed instead of determining whether or not to tag the IP address as anomalous. The technician(s) and technician contact information may be stored in a company directory identifying production servers and, for each server, associated technician(s) and technician information. The remediation framework may tag the HTTP request as anomalous in response to an instruction received from a technician to tag the HTTP request as anomalous.

The remediation framework may send the notification when the remediation framework determines that the HTTP request and associated data: includes an IP address listing a predefined term; is identified as originating from a production server; is associated with an account ID that identifies a service account; is either associated with a user agent that identifies a program or is not associated with any user name; is associated with an identification number that, in a central registry, identifies a production application; and, in some embodiments, if an IP address included in the request has been tagged as anomalous.

The notification may include a query identifying the HTTP request. The notification may include a first selectable icon and a second selectable icon. An exemplary first selectable icon may include text such as "known traffic" and an exemplary second selectable icon may include text such as "unknown traffic."

The first selectable icon, when selected, may inform the remediation framework that the HTTP request is known to the technician. When the first selectable icon is selected, the remediation framework may terminate the review of the HTTP request. When the first selectable icon is selected, the remediation framework may store data relating to the HTTP request so that, in the future, a similar or identical HTTP request will not trigger the remediation framework to review the HTTP request to determine if the HTTP request is an anomalous HTTP request. Storing data associating the HTTP request may circumvent the remediation framework reviewing the HTTP request to determine if the HTTP request and associated data has one or more characteristics as described above.

The second selectable icon, when selected, may inform the remediation framework that the HTTP request is unknown to the technician. In response, the remediation framework may be triggered to perform remedial action described herein.

The remediation framework, when the IP address is determined to be anomalous, may take remedial action for the anomalous HTTP request. The remediation framework, when the IP address is determined to be anomalous, may be triggered to take remedial action. The remedial action may include accessing the production server from which the anomalous HTTP request originated. The remediation framework may identify the production server from which the anomalous HTTP request originated by extracting origination data from the anomalous HTTP request, the origination data identifying the production server.

The remediation framework, when triggered to perform the remedial action, may query a directory to identify one or more authorized applications running on the production server. The remediation framework, when triggered to perform the remedial action, may quarantine one or more unauthorized applications running on the production server. The quarantining may be achieved by moving each of the identified authorized applications from the production server to a replacement server. After the quarantining the production server may be altered to be, or renamed as, a modified production server.

The remediation framework, when triggered to perform the remedial action, may create a shadow account. The shadow account may support electronic receipt and storage of data. The shadow account may accumulate, and store, third-party data requested by the modified production server. The shadow account may accumulate, and store, third-party data pushed to the modified production server.

The remediation framework, when triggered to perform the remedial action, may transmit to the proxy server instructions to take remedial action. Some or all of the steps executed by the proxy server, when implementing the remedial action, may be in response to instructions received from the remediation framework.

The proxy server may be configured to implement the remedial action by terminating all third-party data transmission to the modified production server. In some embodiments, the implementing of the remedial action by the proxy server may include the proxy server firing the anomalous HTTP request. In some embodiments, the implementing of the remedial action by the proxy server may include the proxy server not firing the anomalous HTTP request.

The proxy server may be configured to implement the remedial action by redirecting to the shadow account all received third-party data directed to the modified production server. Exemplary received third-party data may include data transmitted to the proxy server, from the internet, directed to the modified production server.

The proxy server may be configured to implement the remedial action by, in response to receiving a new HTTP request from the modified production server, forwarding a copy of the HTTP request to the shadow account. In response to receipt of the new HTTP request, the proxy server may execute the new HTTP request. When a response to the new HTTP request is received, by the proxy server, the proxy server may, in some embodiments, link the response to the new HTTP request. The proxy server may transmit the response and the new HTTP request to the shadow account.

The remediation framework may be configured to review data stored in the shadow account for predetermined terms, content or information. In the event that the remediation framework identifies predetermined terms, content or information, in the shadow account, associated with sensitive, unauthorized, or harmful data, the remediation framework may shut down the modified production server to fully disable all activities executed by the modified production server.

Review of the shadow account by a technician may provide a holistic view of requests that the unauthorized applications are attempting to make, and data that is being sent, by third-party applications on the internet, to the unauthorized applications.

Completion, by the proxy server, of the remedial action in connection with the anomalous HTTP request may truncate functionality of the one or more unauthorized applications running on the modified production server. The truncated functionality may be functionality that relies on receipt of third-party data and/or transmission of data to one or more third parties.

As set forth above, an HTTP request being reviewed by the remediation framework for possibly being an anomalous HTTP request may be associated with an identification number that, in a central registry, identifies a production application. The identification number may be associated with one or more registered applications. The registered applications may be known applications, vetted by a company, that are running on a company server.

Using contact information from the central registry, the remediation framework may attempt to associate the HTTP request with the one or more registered applications. If the remediation framework cannot associate the HTTP request with the one or more registered applications using methods described herein, the HTTP request may be determined by the system to have been generated by an unregistered application ("Shadow IT") and, therefore, classified/tagged as an 'anomalous HTTP request' and subject to the possible restrictions or quarantine detailed herein.

In some of these embodiments, the remediation framework, after identifying an anomalous HTTP request using systems and methods described above, may, instead of, or in addition to accessing the production server, query a directory to identify one or more authorized applications associated with the identification number. The remediation framework may then quarantine one or more unauthorized applications associated with the identification number by assigning each of the authorized applications to a new identification number. Now, any traffic being received by the proxy server that is associated the identification number may be tagged as an anomalous HTTP requests and re-directed to a shadow account as described above.

In some of these embodiments, the remediation framework may instruct the proxy server to block all HTTP requests associated with the identification number.

In some of these embodiments, the remediation framework may create a shadow account for accumulating third-party data requested by an HTTP request associated with the identification number. The shadow account may also accumulate third-party data pushed to a destination address associated with the identification number. The remediation framework may instruct the proxy server to take remedial action. The proxy server may be configured to implement the remedial action by one or more of: terminating all third-party data transmission to a destination address associated with the identification number; redirecting to the shadow account all received third-party data directed to a destination address associated with the identification number; in response to receiving a new HTTP request associated with the identification number, forwarding a copy of the HTTP request to the shadow account; executing the new HTTP request; and when a response to the new HTTP request is received, linking the response to the new HTTP request and transmitting the response and the new HTTP request to the shadow account. Completion, by the proxy server, of the remedial action may truncate functionality of the one or more unauthorized applications associated with the identification number.

The proxy server may be further configured to implement the remedial action by applying a dynamic filter to data the modified production server attempts to transmit to a third-party. The applying the dynamic filter may include receiving data from the modified production server for being transmitted to an IP address. The applying the dynamic filter may include filtering the data for sensitive information. When the data is determined to contain sensitive information, the proxy server may be configured to transmit the data to the shadow account and transmit instructions to the remediation framework to shut down the modified production server.

The dynamic filter may also include the proxy server receiving data from the modified production server for being transmitted to an IP address. If a size of the data is determined, by the proxy filter, to be greater than a predetermined size, the dynamic filter may also include transmitting the data to the shadow account and/or transmitting instructions to the remediation framework to shut down the modified production server.

When the dynamic filter is a first dynamic filter, the proxy server may be further configured to implement the remedial action by applying a second dynamic filter to third-party data transmitted to the modified production server. The second dynamic filter may include the proxy server receiving data from an IP address for transmission to the modified production server. If a size of the data is determined, by the proxy server, to be greater than a predetermined size, the second dynamic filter may include transmitting the data to the shadow account and/or transmitting instructions to the remediation framework to shut down the modified production server.

The remediation framework may be configured to remove redundancies and enhance network performance. The remediation framework may extract from the group a subset of HTTP requests. Each of the HTTP requests in the subset may be calling an IP address including a term. Each of the HTTP requests in the subset may include an IP address including a term. The term may be a term that is not associated with a programming language.

Exemplary terms may include the terms 'weather', 'stock', 'temperature' and 'forecast'. Exemplary words associated with a programming language may include the words 'API', 'www', and '.com' and '.org'. In some embodiments, the term may be selected from a list of predefined terms.

The remediation framework may determine if the HTTP requests in the subset are calling, or including, more than a threshold number of IP addresses. If the HTTP requests in the subset include more than the threshold number of IP addresses, the remediation framework may create a first group including a predetermined number of the IP addresses in the subset. The predetermined number may be less than the threshold number. The second group may include the IP addresses in the subset but not included in the first group.

In exemplary embodiments, when the HTTP requests in the subset are determined to be calling four or more different IP addresses, the remediation framework may create a first group including three or less IP addresses and a second group including one or more IP addresses.

The remediation framework may instruct the proxy server to intercept HTTP requests calling an IP address included in the second group and to re-direct the intercepted traffic to an IP address included in the first group of IP addresses. In response to receipt of the instructions, the proxy server may intercept HTTP requests calling an IP address included in the second group and re-directing the intercepted traffic to an IP address included in the first group of IP addresses.

The remediation server may instruct the proxy server, upon the lapse of a predetermined time period, to block all HTTP requests calling an IP address included in the second group. In response to receipt of the instructions, the proxy server may block all HTTP requests calling an IP address included in the second group of IP addresses.

In some embodiments, creation, by the remediation framework, of the first group, may include the remediation framework identifying IP addresses for which a Service Level Agreement ("SLA") contract is in place with a company supporting the IP address. In some of these embodiments, when a number of IP addresses for which an SLA contract is in place is less than the predetermined number, the remediation framework may include each of the IP addresses for which an SLA contract is in place in the first group.

In some embodiments, when the number of IP addresses for which an SLA contract is in place is greater than the predetermined number, the remediation framework may rank the IP addresses for which an SLA contract is in place based on the terms of the SLA contract. The terms may include usage terms and conditions. The remediation framework may include in the first group the predetermined number of IP addresses, the IP addresses included in the group having the highest ranking.

In some embodiments, including an IP address in the second group may include the remediation framework automatically terminating an existing SLA with a company supporting the IP address.

In some embodiments, in the event that an IP address in the first group is supported by a company for which no Service Level Agreement ("SLA") is in place, the remediation framework may automatically generate a request to a company representative to establish a contract with the company supporting the IP address.

It follows that consolidating and reducing a number of IP addresses being called by a company's applications may reduce exposure of the company to failure of IP addresses. Additionally, prioritizing IP addresses for which the company already has SLAs in place may enhance robustness of the company's external data sets. For example, if a company's applications are calling 10 different IP addresses including the term 'weather' to obtain temperature measurements, using the proxy server to re-direct this traffic to four, three, or less websites for which the company has an SLAs in place will strengthen the company's knowledge of its external information usage and ensure that websites being called have been previously vetted by the company.

The extracting from the proxy long the group of HTTP requests may include the remediation framework assigning one or more weights to HTTP requests included in the proxy log. The assigning weights may include calculating a value for HTTP requests stored in the proxy log. The HTTP requests in the proxy log processed by the remediation framework may include some or all outgoing HTTP requests stored by the proxy log that were received by the proxy log during a time period, such as HTTP requests received within the past day, week, month, two months, six months, one year, or any other suitable time period.

A first weight, second weight, third weight, fourth weight, fifth weight and, in some embodiments, a sixth weight, seventh weight and/or eight weight, may be assigned to an HTTP request if the HTTP request is determined, by the remediation framework, to fulfill predetermined requirement(s) associated with each of the weights, as detailed below.

The remediation framework assigning a first weight to each HTTP request if the HTTP request, in the proxy log, requests to access an IP address including a predefined term. The predefined term may be "API".

In some embodiments, the remediation framework, upon identification of the predefined term, may query a list to determine if the IP address, or a term in the IP address, is associated with a company or service for which a contract is in place to allow usage of the API. If a contract exists, the processing of the HTTP request may be truncated, and the HTTP request may not be included in the group.

The monitoring may include the remediation framework accessing contents of each HTTP request. For each HTTP request, the remediation framework may perform pattern recognition on the contents to identify conformance of the content to a predetermined protocol. Exemplary protocol may be API protocol. In some embodiments, the remediation framework may perform pattern recognition to identify conformance with one or more of XML protocol, j son protocol, SOAP protocol, and HTML.

If the contents are determined, by the remediation framework, to conform to one of XML protocol, j son protocol, SOAP protocol, the remediation framework may assign a sixth weight to the associated HTTP request.

If the contents are determined, by the remediation framework, to conform to HTML, the remediation framework may not assign the first weight or the sixth weight to the associated HTTP request.

The processing may include the remediation framework assigning a second weight to each HTTP request if the HTTP request, in the proxy log, is identified as originating from a production server. An HTTP request may be identified as originating from a production server if an origination address of the request identifies a production server. Data identifying the server as a production server, or as a server different from a production server, may be stored in the proxy log.

The processing may include the remediation framework assigning a third weight to each HTTP request if the HTTP request, in the proxy log, is associated with an account ID that identifies a service account. The remediation framework may query a company directory to determine whether or not the account ID identifies a service account. A service account may be an account that is not associated with an end user or a web browser.

The processing may include the remediation framework determining if the HTTP request, in the proxy log, is associated with an account ID that identifies a web browser. The monitoring may include the remediation framework not assigning the third weight to the HTTP request when the HTTP request, in the proxy log, is associated with an account ID that identifies a web browser.

The processing may include the remediation framework assigning a fourth weight to each HTTP request if the HTTP request, in the proxy log, is either associated with a user agent that identifies a program or is not associated with any user name.

The processing may include the remediation framework determining if the HTTP request, in the proxy log, is associated with a user agent that identifies a browser. The processing may include the remediation framework not assigning the fourth weight to the HTTP request if the HTTP request, in the proxy log, is associated with a user agent that identifies a browser. For example, if the HTTP request includes data identifying a web browser, such as the term 'Mozilla', 'Chrome', 'AppleWebKit', 'Firebox', 'Gecko', or any other term identifying a web browser, the fourth weight may not be assigned to the HTTP request.

The processing may include the remediation framework using pattern recognition to determine if the HTTP request, in the proxy log, is associated with a user agent that conforms to Java™ or C sharp programming protocol. The processing may include the remediation framework assigning the fourth weight to the HTTP request if the HTTP request, in the proxy log, is associated with a user agent that conforms to, or includes, Java™ or C sharp programming protocol.

The processing may include the remediation framework assigning a fifth weight to each HTTP request if the HTTP request, in the proxy log, is associated with an identification number that identifies a production application. The identification number may be associated with the HTTP request in a central registry. The central registry may be used, by technicians, to store identification data of all authorized applications running on one or more company servers.

In some embodiments, each identification number may be associated with an identified server. Additionally, each identification number may be associated with one or more technicians and/or employees, each fulfilling a role in one or more of the creation, maintenance and support application(s) associated with the identification number.

In some embodiments, an identification number may be associated with a single application. In some embodiments, an identification number may be associated with two or more applications.

A server may run application(s) associated with one identification number. A server may run application(s) associated with two or more identification numbers.

In some embodiments, the processing may include the remediation framework assigning a seventh weight to an HTTP request when a size of data being transmitted through the proxy server is greater than a predetermined size.

In some embodiments, the processing may include the remediation framework assigning an eighth weight to an HTTP request if a category associated with the HTTP request, in the proxy server, is included in a complied list of categories stored by the proxy server. The categories may be identified as 'high-risk' categories. The category may be assigned to the HTTP request by the proxy server. The category may be selected from a directory of categories that can potentially be assigned to an HTTP request that is stored by the proxy server.

The remediation framework may tally the weights assigned to each HTTP request. The weights may be one, some, or all of the first, second, third, fourth, fifth, sixth, seventh, and eight weights detailed above, or any other suitable weight that may be assigned to an HTTP request. Additional weights, values, and scaling factors may be used by the remediation framework to calculate a final value of the tallied weight of each HTTP request.

When the tallied weight for one of the processed HTTP requests is above a threshold value, the remediation framework may be triggered to extract the HTTP request from the proxy log and include the HTTP request in the group.

When the tallied weight is below the threshold value, the remediation framework may take no action. When the tallied weight is below the threshold value, the remediation framework may not extract the HTTP request from the proxy log for inclusion in the group.

When the tallied weight is below the threshold value, the remediation framework may terminate the processing of the HTTP request. In some embodiments, termination of the processing of the HTTP request, by the remediation framework, may trigger the proxy server to fire the HTTP request. In some embodiments, termination of the monitoring of the HTTP request, by the remediation framework, may trigger the remediation framework to transmit an instruction to the proxy server to fire the HTTP request.

When the tallied weight of one of the HTTP requests is above a threshold value, and, in some embodiments, when the IP address is tagged as anomalous, HTTP request may be tagged as an anomalous HTTP request and the remediation framework may be triggered to take remedial action as described herein. When the tallied weight of an HTTP request is below the threshold value, and, in some embodiments, when the IP address of the HTTP request is not tagged as anomalous, the remediation framework may take no remedial action in connection with the HTTP request.

The tallied weight of an HTTP request may be above the threshold value when the HTTP request: includes an IP address listing a predefined term; is identified as originating from a production server; is associated with an account ID that identifies a service account; is either associated with a user agent that identifies a program or is not associated with any user name; and is associated with an identification number that, in a central registry, identifies a production application.

The processing may include the remediation framework aggregating HTTP requests transmitted to an IP address over a time period. The processing may include the remediation framework identifying a time lapse between each of the HTTP requests transmitted to the IP address over the time period. The processing may include the remediation framework being triggered to tag an HTTP request as an anomalous HTTP request and perform remedial action when the time lapse is determined to be a constant value between each of the HTTP requests transmitted to the IP address over the time period. Time lapses between requests may be determined to be a 'constant value' when the time lapses are equivalent down to the minute, second, millisecond, or any other suitable time measurement. Such equivalence may strongly indicate that these requests are being generated by applications and not a human.

The remediation framework may be triggered to tag an HTTP request as an anomalous HTTP request and perform remedial action by assigning an additional weight to the HTTP request that will bring the tallied weight over the threshold value. The remediation framework may be triggered independent of whether or not the tallied weight of the HTTP request is above or below the threshold value.

The processing may include aggregating HTTP requests by company. For example, all HTTP requests sent to a Google™ API may be aggregated. These requests may then be reviewed during a time period for requests having a constant time lapse.

In some embodiments, when the remediation framework identifies the anomalous HTTP request, the remediation framework may be further triggered to perform remedial action for the anomalous HTTP request. The remedial action may include to determining if a production server from which the anomalous HTTP request originated is assigned to a first tier of importance or a second tier of importance.

The first tier of importance may include a first permitted downtime. The second tier of importance may include a second permitted downtime. The second permitted downtime may be longer than the first permitted downtime. The first permitted downtime may be less than a threshold value. The second permitted downtime may be greater than a threshold value. The remediation framework may determine that a production server is assigned to the first tier of importance if the production server is associated with a permitted downtime that is less than the threshold value. The remediation framework may determine that a production server is assigned to the second tier of importance if the production server is associated with a permitted downtime that is greater than the threshold value.

The first tier of importance may correspond to a first hierarchical placement, in a company, of the one or more web application(s) supported by a first production server. The second tier of importance may correspond to a second hierarchical placement, in a company, of the one or more web application(s) supported by a second production server. The first hierarchical placement may be relatively more important, based on the hierarchy, than the second hierarchical placement. A cut-off, or threshold, hierarchical placement may be used by the remediation framework to determine if a production server is to be assigned to the first tier or importance or the second tier of importance.

In some of these embodiments, when the production server is determined to be assigned to a first tier of importance, the production server may be configured to instruct the proxy server to increase monitoring of data being sent to, and received from, the production server.

The proxy server may be configured to increase monitoring of data being sent to, and received from, the production server in response to receipt of instructions from the remediation framework. In addition to the proxy server, other network components such as switches, gateways, etc., and servers, such as databases, applications, workflows, etc., may be part of the network topology or application architecture. One or more of the aforementioned components may be instructed, by the proxy server and/or by the remediation framework, to perform additional monitoring when suspected unauthorized use of resources has been identified.

In some of these embodiments, when the production server is determined to be assigned to a second tier of importance, the second tier of importance being less than the first tier of importance, the remediation framework may be configured to execute remedial action detailed above. The remedial action may include one or more of the accessing the production server from which the anomalous HTTP request originated; the querying a directory to identify one or more authorized applications running on the production server; the quarantining one or more unauthorized applications running on the production server; the creating a shadow account for accumulating third-party data requested by the modified production server and accumulating third-party data pushed to the modified production server, and the instructing the proxy server to take remedial action, and any other additional or alternative remedial action described above or herein.

When the production server is determined to be assigned to the second tier of importance, the proxy server may be configured to implement proxy-server-remedial-action detailed above. The remedial action may include one or more of the firing or the not firing of the anomalous HTTP request, the terminating all third-party data transmission to the modified production server; the redirecting to the shadow account all received third-party data directed to the modified production server; the, in response to receiving a new HTTP request from the modified production server, forwarding a copy of the HTTP request to the shadow account, the executing the new HTTP request; and, when a response to the new HTTP request is received, the linking the response to the new HTTP request and transmitting the response and the new HTTP request to the shadow account, and any other additional or alternative remedial action described above or herein. As detailed above, completion, by the proxy server, of the remedial action may truncate functionality of the one or more unauthorized applications running on the modified production server.

When the production server is determined, by the remediation framework, to be assigned to the first tier of importance, the remediation framework may be further configured to instruct the proxy server to: continually monitor a size of outgoing traffic from the production server for a data extrusion event; and in response to detection of the data extrusion event, shut down the production server.

The proxy server, in response to receipt of the instructions from the production server, may be configured to continually monitor the size of outgoing traffic from the production server for the data extrusion event and shut down the production server in response to determining that a size of outgoing traffic is greater than a predetermined threshold. The determination, by the proxy server, that a size of outgoing traffic is greater than the predetermined threshold may identify the data extrusion event.

The anomalous HTTP request may be a first anomalous HTTP request. The remediation framework may be configured to identify a second anomalous HTTP request. The identification of the second anomalous HTTP request may include the remediation framework performing an initial analysis including an initial filtering of HTTP requests.

The initial filtering may be an initial filtering of HTTP requests included in the group. The initial filtering may be performed prior to the remediation framework extracting from the group a subset of HTTP requests.

The initial filtering may be an initial filtering of outgoing HTTP requests included in the proxy log.

In some embodiments, the HTTP requests included in the initial filtering may be put on hold and not fired by the proxy server until the remediation framework completes the initial filtering. An HTTP request determined, during the initial filtering, to be a second anomalous HTTP request, may be put on hold as discussed below. An HTTP request determined, during the initial filtering, not to be anomalous, may be subsequently fired by the proxy server after the determination.

The initial analysis may include, for each HTTP request included in the group, determining if the HTTP request is in conformance with service level agreement ("SLA") terms and conditions. Exemplary terms and conditions include if the HTTP request is, or is not, violating a maximum number of calls that may be received by an API during a SLA time period.

The initial analysis may include extracting from the HTTP request an API identifier. The initial analysis may include querying a database to determine if the API identifier matches a stored API identifier. When the API identifier matches a stored API identifier, the initial analysis may include retrieving from the database a usage limit including a maximum number of calls, including the API identifier, permitted to be generated during a SLA time period.

When the API identifier is associated with an unlimited usage limit, the remediation framework may truncate the initial analysis of the HTTP request.

When the API identifier includes a limited usage limit, the initial analysis may include extracting from the proxy log a first HTTP request associated with a first timestamp and a second HTTP request associated with a second timestamp. The first HTTP request may be a most-recently fired HTTP request including the API identifier. The first HTTP request may be fired by the proxy server.

A number of HTTP requests including the API identifier that were fired during a duration extending between, and including, the first timestamp the second timestamp may be equal to the maximum number of calls. Thus, the first HTTP request and the second HTTP request may be the most-recent and the latest-most requests, respectively, that were fired by the proxy server in a sequentially-generated group of HTTP requests, each request including the API identifier and the group including the maximum number of calls.

When a period of time extending between a current time and the second timestamp is greater than the SLA time period, the remediation framework may truncate the monitoring of the HTTP request. The current time may be a time accessed by the remediation framework that indicates the time of day during which the remediation framework is performing the initial analysis.

When the period of time is less than the SLA time period, the remediation framework may tag the HTTP request as a second anomalous HTTP request. The remediation framework may transmit to the proxy server a set of instructions to temporarily quarantine the second anomalous HTTP request for a quarantine time period and, in some embodiments, to remove the second anomalous HTTP request from the group. The remediation framework may calculate the quarantine time period. The quarantine time period may be an absolute difference between a first unit of time, defined by the SLA time period, and a second unit of time spanning between the first timestamp and the second timestamp. The quarantine time period may ensure that the SLA terms and conditions are not being violated by IT professionals that have programmed API calls into their programs and may not be aware of existing SLA terms and conditions.

The proxy sever may, in response to receipt of the set of instructions, quarantine the second anomalous HTTP request and, upon the lapse of the quarantine time period, fire the second anomalous HTTP request. In some embodiments, the set of instructions may include instructions to quarantine, during the quarantine time period, any additional HTTP requests received by the proxy server that include the API identifier.

In the event that the HTTP request reviewed during the initial analysis is not determined to be a second anomalous HTTP request, the remediation framework may leave the HTTP request in the group. Truncating the monitoring of an HTTP request during the initial analysis may include transmitting an instruction to the proxy server to fire the HTTP request.

In some embodiments, the initial analysis may additionally, or alternately, including determining if the HTTP request is in conformance SLA terms and conditions including a maximum number of bytes which may be updated from a website during a SLA time period. A determination that the HTTP request is not in conformance may result in the HTTP request being determined to be a second anomalous HTTP request.

The initial analysis may include, for each HTTP request included in the group, determining if the HTTP request is in conformance with SLA terms and conditions. Exemplary terms and conditions include if the HTTP request is, or is not, violating a usage limit including a maximum number of bytes which may be uploaded from a website including the API identifier during a SLA time period.

The initial analysis may include the remediation framework retrieving from the database, for each HTTP request included in the group, a usage limit including a maximum number of bytes which may be uploaded from a website including the API identifier during a SLA time period.

The initial analysis may include extracting from each HTTP request an API identifier. The initial analysis may include querying a database to determine if the API identifier matches a stored API identifier.

The initial analysis may include the remediation framework compiling, based on data stored in the proxy log, a volume of data received from IP addresses including the API identifier during the SLA time period. When the API identifier matches a stored API identifier, the initial analysis may include retrieving from the database a usage limit including a maximum number of bytes which may be uploaded from a website including the API identifier during a SLA time period.

The initial analysis may include compiling, based on data stored in the proxy log, a volume of data received from IP addresses including the API identifier during the SLA time period. When the compiled volume is less than the maximum number of bytes, the initial analysis may include truncating the initial analysis of the HTTP request. In some embodiments, the truncating of the initial analysis may include transmitting to the proxy server a first set of instructions to fire the HTTP request.

When the complied volume is greater than the maximum number of bytes, the initial analysis may include tagging the HTTP request as a second anomalous HTTP request. The initial analysis may also include the remediation framework iteratively compiling bytes received from IP addresses including the API identifier in sequential order beginning with a most-recent transmission of bytes and tagging a transmission from an IP address whose byte volume, when added to the iteratively complied bytes, sets the value of compiled bytes to meet or exceed the maximum number.

The initial analysis may include the remediation framework transmitting to the proxy server a second set of instructions to temporarily quarantine the second anomalous HTTP request for a quarantine time period and, in some embodiments, to remove the second anomalous HTTP request from the group. The remediation framework may calculate the quarantine time period. The quarantine time period may be an absolute difference between a first unit of time, defined by the SLA time period, and a second unit of time spanning between a timestamp of the most-recent transmission of bytes and a timestamp associated with the tagged transmission.

The proxy server may, in response to the receipt of the first set of instructions, fire the HTTP request. The proxy sever may, in response to receipt of the second set of instructions, quarantine the second anomalous HTTP request and, upon the lapse of the quarantine time period, fire the second anomalous HTTP request. In some embodiments, the second set of instructions includes instructions to quarantine, during the quarantine time period, any additional HTTP requests received by the proxy server that include the API identifier.

The apparatus and methods may include methods for quarantining shadow IT. The methods may include filtering, using a content-filtering web proxy server, HTTP requests and storing the HTTP requests and data associated with the HTTP requests in a proxy log. The methods may include extracting, from the proxy log, a group of HTTP requests received by the proxy server. In some embodiments, the proxy server may put the extracted HTTP requests on a temporary hold while extracted HTTP requests are being monitored by the remediation framework for potentially including one or more anomalous HTTP requests.

In some embodiments, the HTTP requests may be requests received by the proxy server but not yet fired by the proxy server. Such HTTP requests may be referred to alternately as 'pending HTTP requests.'

In some embodiments, the HTTP requests may include both pending HTTP requests and HTTP requests that have already been fired by the proxy server.

Each of the HTTP requests extracted from the proxy log by the remediation framework may be HTTP requests having been identified, by the remediation framework, as satisfying one, two, three, four, or all of the following conditions: includes an IP address listing a predefined term; is identified as originating from a production server; is associated with an account ID that identifies a service account; is either associated with a user agent that identifies a program or is not associated with any user name; and is associated with an identification number that, in a central registry, identifies a production application.

The methods may include the remediation framework processing data in the proxy log for satisfaction of the aforementioned condition(s) as described in more detail above. The methods may include the remediation framework assigning weights to an HTTP request based on characteristics of the HTTP request and associated data.

The methods may include the remediation framework identifying an anomalous HTTP request in the group. The anomalous HTTP request may be identified by querying stored information associated with each of the identification numbers and identifying an IP address associated with one of the HTTP requests in the group that is anomalous based on the stored information associated with the identification number. Methods for determining whether or not the stored IP address is anomalous are set forth above.

The methods may include the remediation framework removing the anomalous HTTP request from the group. The methods may include the remediation framework performing remedial action in connection with the anomalous HTTP request. In some embodiments, the remediation framework may be triggered to perform the remedial action when a tallied weight of weights assigned to the HTTP request is above a threshold value. Methods for determining weight(s) to assign to an HTTP request include some or all of the methods for determining the first weight, the second weight, the third weight, the fourth weight, the fifth weight, and, in some embodiments, the sixth weight, described above.

The methods may include the remediation framework performing the remedial action. The remedial action may include the remediation framework accessing the production server from which the anomalous HTTP request originated. The remedial action may include the remediation framework querying a directory to identify one or more authorized applications running on the production server from which the anomalous HTTP request originated.

The remedial action may include the remediation framework quarantining one or more unauthorized applications running on the production server from which the anomalous HTTP request originated. The quarantining may include moving each of the identified authorized applications from the production server to a replacement server. After the quarantining, the production server may be altered to be a modified production server.

The remedial action may include the remediation framework creating a shadow account. The shadow account may be for accumulating third-party data requested by the modified production server. The shadow account may be for accumulating third-party data pushed to the modified production server. The remedial action may include the remediation framework instructing the proxy server to take remedial action.

The methods may include the proxy server implementing the remedial action. The remedial action implemented by the proxy server may be remedial action for which instructions were received from the remediation framework to execute. The remedial action may include the proxy server terminating all third-party data transmission to the modified production server. The remedial action may include the proxy server redirecting to the shadow account all received third-party data directed to the modified production server.

The remedial action may include the proxy server, in response to receiving a new HTTP request from the modified production server, forwarding a copy of the HTTP request to the shadow account. The remedial action may include the proxy server executing the new HTTP request. The remedial action may include, when a response to the new HTTP request is received, the proxy server linking the response to the new HTTP request and transmitting the response and the new HTTP request to the shadow account.

Completion, by the proxy server, of the remedial action may truncate functionality of the one or more unauthorized applications running on the modified production server.

The methods may include the proxy server implementing the remedial action by applying a dynamic filter to data the modified production server attempts to transmit to a third-party. The applying the dynamic filter may include the method steps of receiving data from the modified production server for being transmitted to an IP address and filtering the data for sensitive information. When the data is determined to contain sensitive information, the methods may include the proxy server transmitting the data to the shadow account and transmitting instructions to the remediation framework to shut down the modified production server.

The methods may include the proxy server applying the dynamic filter. The methods may include the proxy server receiving data from the modified production server for being transmitted to an IP address. The methods may include the proxy server determining that a size of the data received from the modified production server being greater than a predetermined size.

When the size of the data is determined, by the proxy server, to be greater than a predetermined size, the methods may include the proxy server transmitting the data to the shadow account. When the size of the data is determined, by the proxy server, to be greater than a predetermined size, the methods may include the proxy server transmitting instructions to the remediation framework to shut down the modified production server.

When the size of the data is determined, by the proxy server, to be greater than a predetermined size, the methods may include the proxy server denying all requests, by the modified production server, to transmit data, such as data to the internet.

The methods may include, when the dynamic filter is a first dynamic filter, further comprising implementing remedial action, using the proxy server, by applying a second dynamic filter to third-party data transmitted to the modified production server.

The proxy server may receive data from an IP address for transmission to the modified production server. The applying the second dynamic filter may include, when a size of the data is determined, by the proxy server, to be greater than a predetermined size, transmitting the data to the shadow account. The applying the second dynamic filter may include, when a size of the data is determined, by the proxy server, to be greater than a predetermined size, transmitting the data to the shadow account, transmitting instructions to the remediation framework to shut down the modified production server.

The applying the second dynamic filter may include, when a size of the data is determined, by the proxy server, to be greater than a predetermined size, blocking all data transmission, through the proxy server, such as from the internet, to the modified production server.

The methods may include removing redundancies and enhancing network performance by the remediation framework by performing the method steps of extracting from the group a subset of HTTP requests. Each of the HTTP requests in the subset may be calling an IP address including a term. The term may not be a term associated with a programming language. The term may be any suitable term, such as a term described herein.

The methods may include, when the HTTP requests in the subset are determined to be calling more than a predetermined number of IP addresses, such as, for example, four or more different IP addresses, creating a first group including less than the predetermined number of IP addresses, such as, for example, three or less IP addresses. The methods may include creating a second group including IP addresses not included in the first group, such as, for example, one or more IP addresses.

The methods may include the remediation framework instructing the proxy server to intercept HTTP requests calling an IP address included in the second group and to re-direct the intercepted traffic to an IP address included in the first group of IP addresses.

The methods may include the proxy server intercepting traffic directed the second group of IP addresses and re-directing the intercepted traffic to an IP address included in the first group of IP addresses.

The methods may include the remediation framework determining if the HTTP requests in the subset are calling, or including, more than a threshold number of IP addresses. If the HTTP requests in the subset include more than the threshold number of IP addresses, the remediation framework may create a first group including a predetermined number of the IP addresses included in the subset. The predetermined number may be less than the threshold value. The second group may include the IP addresses included in the subset but not included in the first group.

The methods may include actions, described above in connection with the system, such as actions described above being executed by the remediation framework and/or the proxy server.

The methods may include filtering the proxy data by the production servers. The methods may include only displaying data sent from and, in some embodiments, received from, a single production server.

The methods may include generating one or more reports. Exemplary reports are illustrated in FIGS. 5-9 of the application.

The methods may include the remediation framework performing the initial analysis. The initial analysis may include the method steps, performed by the remediation framework, of extracting from the HTTP request an API identifier and querying a database to determine if the API identifier matches a stored API identifier.

When the API identifier matches a stored API identifier, the initial analysis may include the method steps, performed by the remediation framework, of retrieving from the database a usage limit including a maximum number of calls, including the API identifier, permitted to be generated during a SLA time period.

The initial analysis may include the method steps, performed by the remediation framework, of extracting from the proxy log a first HTTP request associated with a first timestamp and a second HTTP request associated with a second timestamp. The first HTTP request may be a most-recently fired HTTP request including the API identifier. A number of HTTP requests including the API identifier that were fired during a duration extending between, and including, the first timestamp the second timestamp may be equal to the maximum number of calls.

When a period of time extending between a current time and the second timestamp is greater than the SLA time period, the initial analysis may include the method steps, performed by the remediation framework, of truncating the monitoring of the HTTP request and transmitting to the proxy server a first set of instructions to fire the HTTP request.

When the period of time is less than the SLA time period, the initial analysis may include the method steps, performed by the remediation framework, of tagging the HTTP request as a second anomalous HTTP request and transmitting to the proxy server a second set of instructions to temporarily quarantine the second anomalous HTTP request for a quarantine time period. The quarantine time period may be calculated by the remediation framework. The quarantine time period may be an absolute difference between a first unit of time, defined by the SLA time period, and a second unit of time spanning between the first timestamp and the second timestamp.

The method may include the proxy server, in response to receipt of the first set of instructions from the remediation framework, firing the HTTP request. The method may include the proxy server, in response to receipt of the second set of instructions from the remediation framework, using the proxy server to quarantine the second anomalous HTTP request for the quarantine time period and fire the second anomalous HTTP request upon the lapse of the quarantine time period.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Illustrative system architecture 100 may include Proxy Server 103. Proxy Server 103 may filter requests passing between World Wide Web 101 (aka the 'internet'), Server 107 and Server 117. Proxy Server 103 may maintain Proxy Log 105. Proxy Log 105 may store data relating to requests received by Proxy Server 103. The requests may include HTTP requests.

Remediation Framework 119 may be in communication with Proxy Server 103. Remediation Framework may also be in communication with Server 107 and Server 117.

Registered Application 109 and Registered Application 111 may run on Server 107. Registered Application 113 and Registered Application 115 may run on Server 117. Each of the registered applications may be assigned an identification number. A central registry may store information for each identification number, identifying the registered application, contact personnel of the registered application, and other characteristics of the registered application.

Unregistered Application 121 may be running on Server 107 without a technician/company being aware of its presence. Unregistered Application 123 may be running on Server 117 without a technician/company being aware of its presence. Apparatus and methods provided herein may be used to identify and isolate Unregistered Application 121 and 123 on a company's network.

Figure 2:
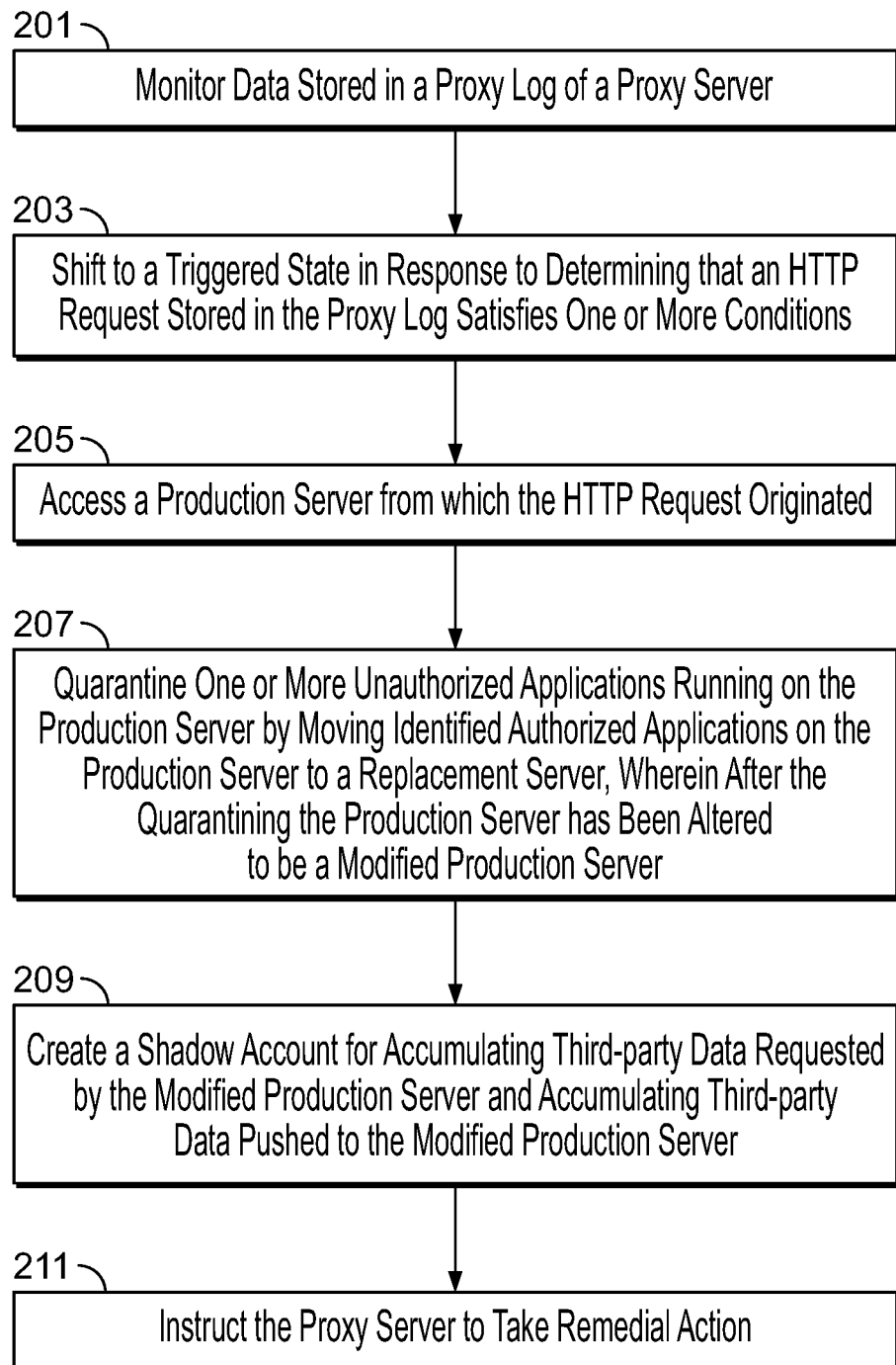
FIG. 2 shows an illustrative method in accordance with principles of the disclosure.

FIG. 2 shows an illustrative method in accordance with the disclosure. The method may be executed by the remediation framework. At step 201, the remediation framework may monitor data stored in a proxy log of a proxy server. At step 203, the remediation framework may shift to a triggered state in response to determining that an HTTP request stored in the proxy log satisfies one or more conditions. The one or more conditions may be conditions described herein.

At step 205, the remediation framework may access a production server from which the HTTP request originated. The remediation framework may identify the production server based on data stored in the proxy log and associated with the HTTP requests. At step 207, the remediation framework may quarantine one or more unauthorized applications running on the production server by moving identified authorized applications on the production server to a replacement server. After the quarantining the production server may be altered to be a modified production server.

At step 209, the remediation framework may create a shadow account for accumulating third-party data requested by the modified production server and accumulating third-party data pushed to the modified production server. The shadow account may be used by a technician to monitor the activity of the unauthorized applications and to aid in identifying the unauthorized applications.

Figure 3:
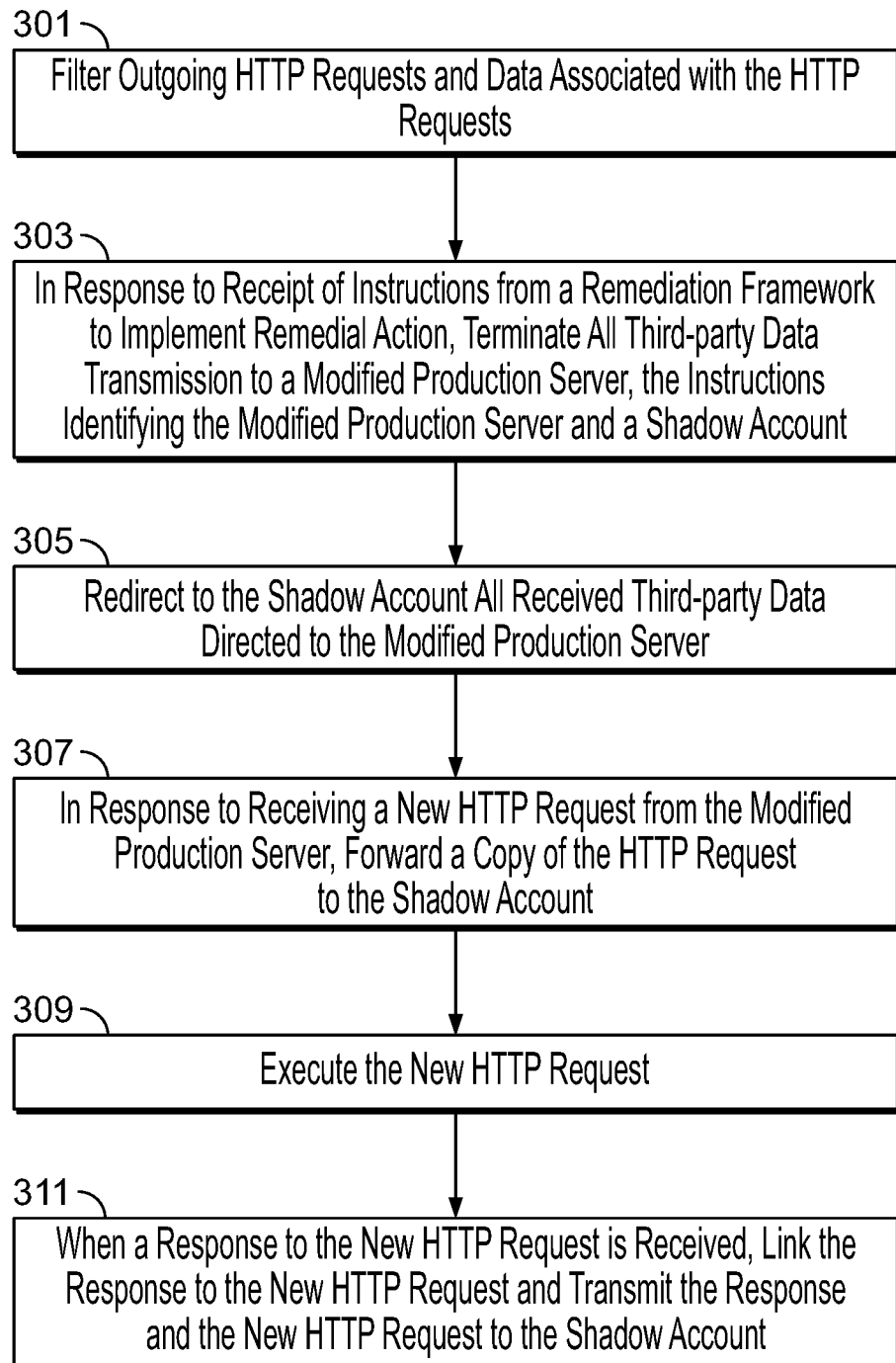
FIG. 3 shows an illustrative method in accordance with principles of the disclosure.

At step 211, the remediation framework may instruct the proxy server to take remedial action. Exemplary remedial action that may be executed by the proxy server is illustrated in FIG. 3. The remedial action instructions transmitted by the remediation framework to the proxy server may include the steps and identifying data required, by the proxy server, to execute the remedial action, such as an identity of the production server and the shadow account.

FIG. 3 shows an illustrative method in accordance with the disclosure. The method may be executed by the proxy server.

At step 301 the proxy server may filter outgoing HTTP requests and data associated with the HTTP requests. At step 303 the proxy server may receive instructions from the remediation framework to implement the remedial action. The instructions may instruct the proxy server to execute steps 303-311. At step 303, in response to receipt of instructions from a remediation framework to implement remedial action, the proxy server may terminate all third-party data transmission to a modified production server.

At step 305 the proxy server may redirect to the shadow account all received third-party data directed to the modified production server. At step 307 the proxy server may, in response to receiving a new HTTP request from the modified production server, forward a copy of the HTTP request to the shadow account. At step 309 the proxy server may execute the new HTTP request. At step 311 the proxy server may, when a response to the new HTTP request is received, link the response to the new HTTP request and transmit the response and the new HTTP request to the shadow account.

Figure 4:
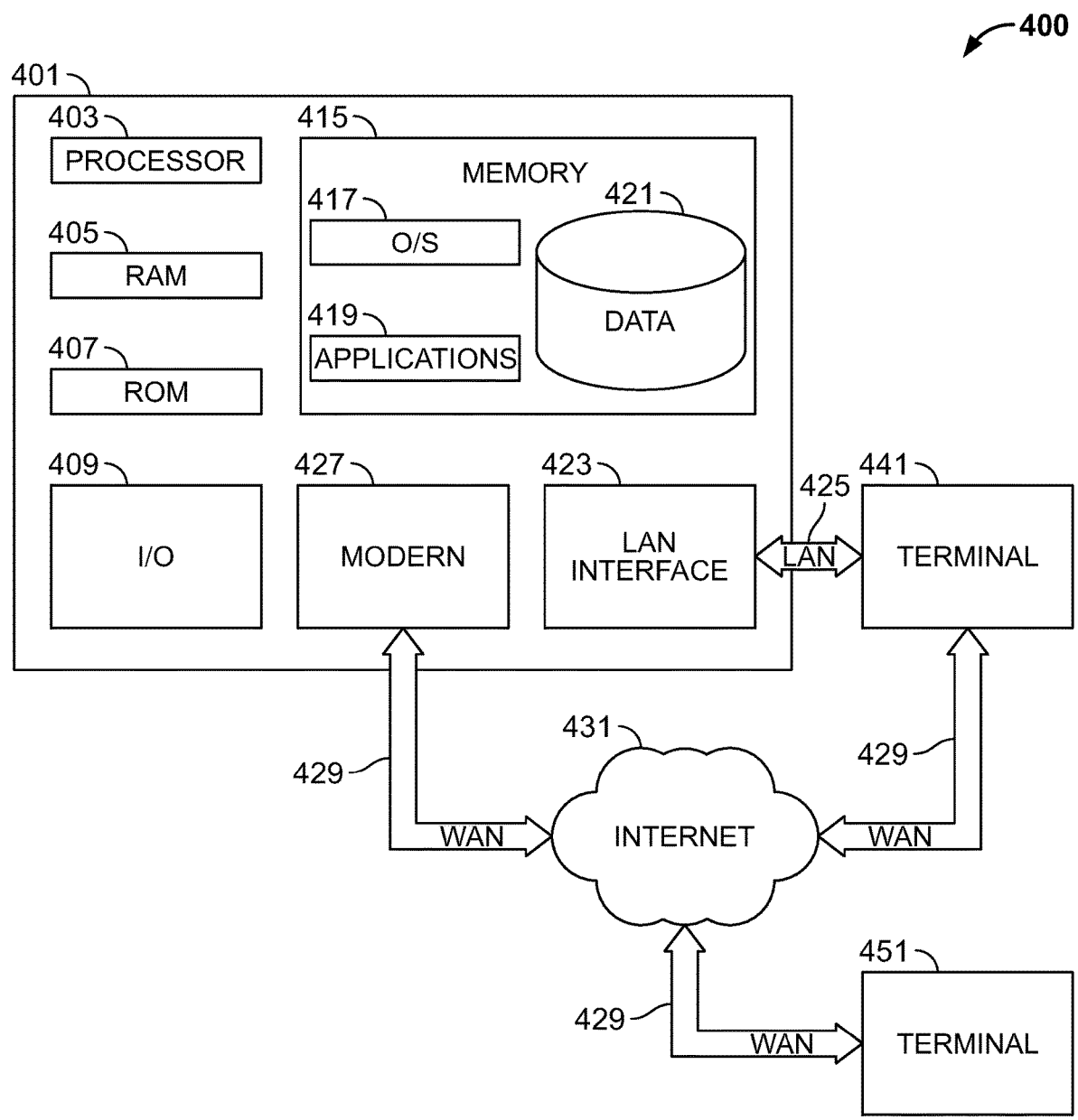
FIG. 4 shows illustrative apparatus in accordance with principles of the disclosure.

FIG. 4 shows illustrative apparatus in accordance with principles of the disclosure. As will be appreciated by one of skill in the art, the invention described herein may be embodied in whole or in part as a method, a data processing system, or a computer program product. Specifically, the proxy server, the remediation framework, the server(s), applications, and the other apparatus described herein may be embodied in whole or in part as a method, a data processing system, or a computer program product. Accordingly, the invention, and one or more of the proxy server, the remediation framework, the server(s), applications, and the other apparatus described herein may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, optical storage devices, magnetic storage devices, flash devices and/or any combination thereof.

FIG. 4 is a block diagram that illustrates computing device 401 that may be used according to an illustrative embodiment of the invention. Specifically, the proxy server, the remediation framework, the server(s), applications, and other apparatus described herein may include some or all of the apparatus described with respect to computing device 401.

Computing device 401 may have a processor 403 for controlling overall operation of the server and its associated components, including RAM 405, ROM 407, input/output module 409, and memory 415. Computing device 401 may include one or more receiver modules, server modules and processors that may be configured to transmit and receive data, such as, for example, HTTP requests, HTTP request information and remediation instructions. Computing device 401 may be configured to transmit and/or receive information and to provide information or commands from/to any suitable system. Additionally, computing device 401 may provide confirmation to mobile devices or terminal 441 and/or terminal 451.

Input/output ("I/O") module 409 may include a microphone, keypad, touch screen, and/or stylus through which a user of computing device 401 may provide input, and may also include one or more speakers for providing audio output and a video display device for providing textual, audiovisual and/or graphical output. The touch screen may also serve as a video display device. The touch screen may respond to "gestures"—e.g. a double tap may open an item and a pinching motion may shrink an item. The touch screen in combination with the video display may be referred to as the "display" of the device.

Software may be stored within memory 415 to provide instructions to processor 403 for enabling computing device 401 to perform various functions. For example, memory 415 may store software used by computing device 401, such as an operating system 417, application programs 419, and an associated database 421. Alternatively, some or all of computing device 401 computer executable instructions may be embodied in hardware or firmware (not shown). Database 421 may provide storage for server information, request information, application information, remediation instructions, and any other suitable information.

Computing device 401 may operate in a networked environment supporting connections to one or more remote computers, such as mobile devices 441 and 451. Mobile devices 441 and 451 may be personal computers or servers that include many or all of the elements described above relative to computing device 401.

The network connections depicted in FIG. 4 include a local area network (LAN) 425 and a wide area network (WAN) 429 but may also include other networks. When used in a LAN networking environment, computing device 401 may be connected to LAN 425 through a network interface or adapter 423. When used in a WAN networking environment, computing device 401 may include a modem 427 or other means for establishing communications over WAN 429 and/or Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. Both computing device 401 and mobile devices 441 and 451 may include networking hardware, networking software or a combination of hardware and software which enables communication over local area network (LAN) 425 and a wide area network (WAN) 429.

Additionally, application program 419, which may be used by computing device 401, may include computer executable instructions for invoking user functionality related to communication, such as email, short message service (SMS), and voice input and speech recognition applications. Computing device 401 and/or mobile devices 441, 451 may also be mobile terminals including various other components, such as a battery, speaker, and antennas (not shown).

Computing device 401, terminal 451 and/or terminal 441 may be portable devices such as a laptop, cell phone, Blackberry™, smartphone, iPad™, iPhone™, Kindle™ or any other suitable device for storing, transmitting and/or transporting relevant information.

Any information described above in connection with database 421, and any other suitable information, may be stored in memory 415.

One or more of applications 419 may include one or more algorithms that may be used to perform one or more of the following: determining whether or not to trigger the remediation framework to perform remedial action, performance, by the remediation framework and/or by the proxy server of remediation action, assigning weights and tallying the weights, and any other method or process described herein.

Figure 5:
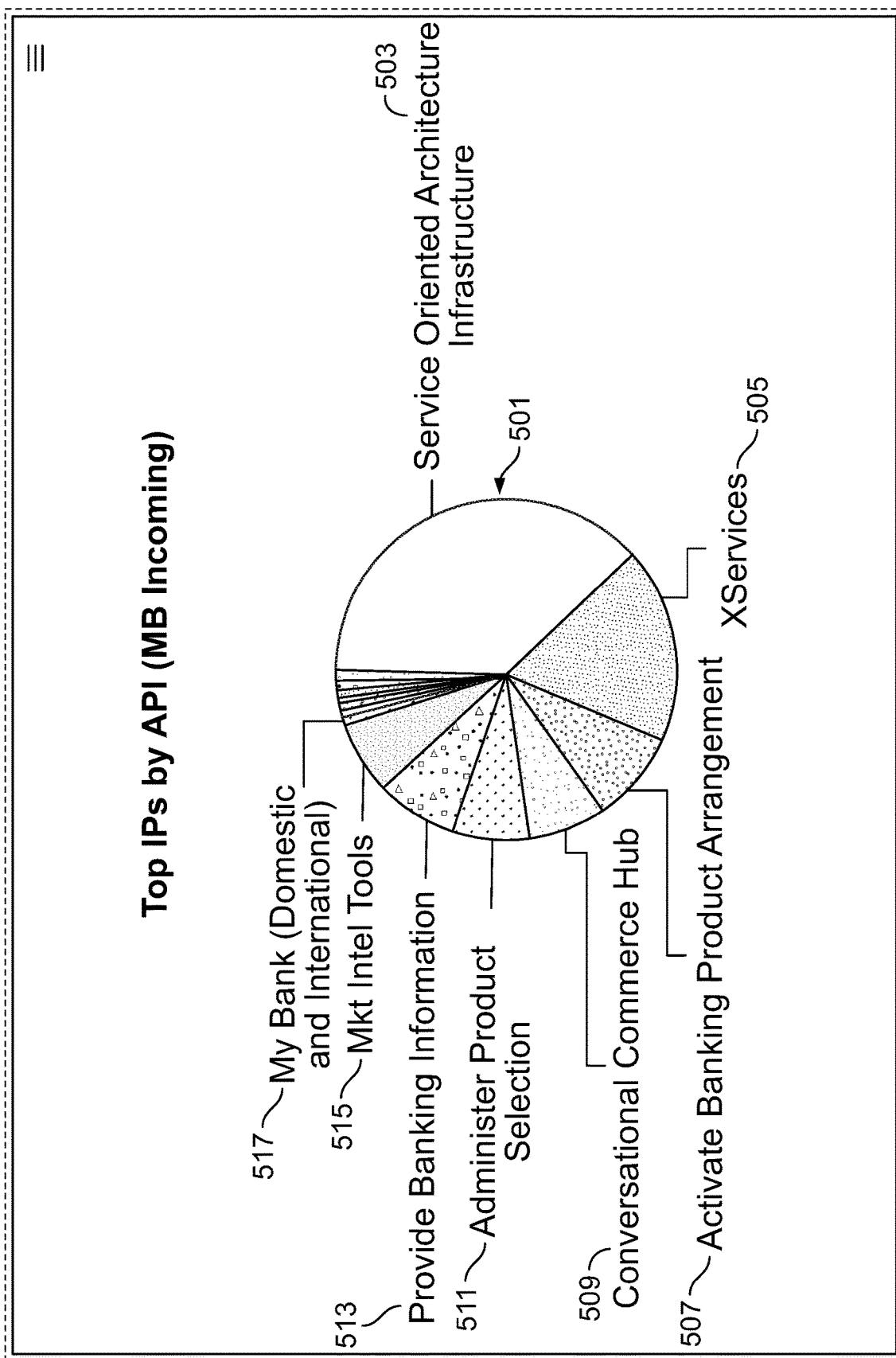
FIG. 5 shows an illustrative graphical user interface in accordance with principles of the disclosure.

FIG. 5 shows an illustrative graphical user interface ("GUI") that may be generated by the proxy server and, in some embodiments, the remediation framework. The illustrative GUI includes pie chart 501 illustrating IP addresses, grouped by APIs, that have generated the most incoming megabytes of data through a system such as a proxy server. The pie chart shows that Service Oriented Architecture Infrastructure 503 has generated the most incoming data, followed, in descending order, by XServices 505, Active Banking Product Arrangement 507, Conversational Commerce Hub 509, Administer Product Selection 511, Provide Banking Information 513, Mkt Intel Tools 515 and My Bank (Domestic and International) 517.

Figure 6:
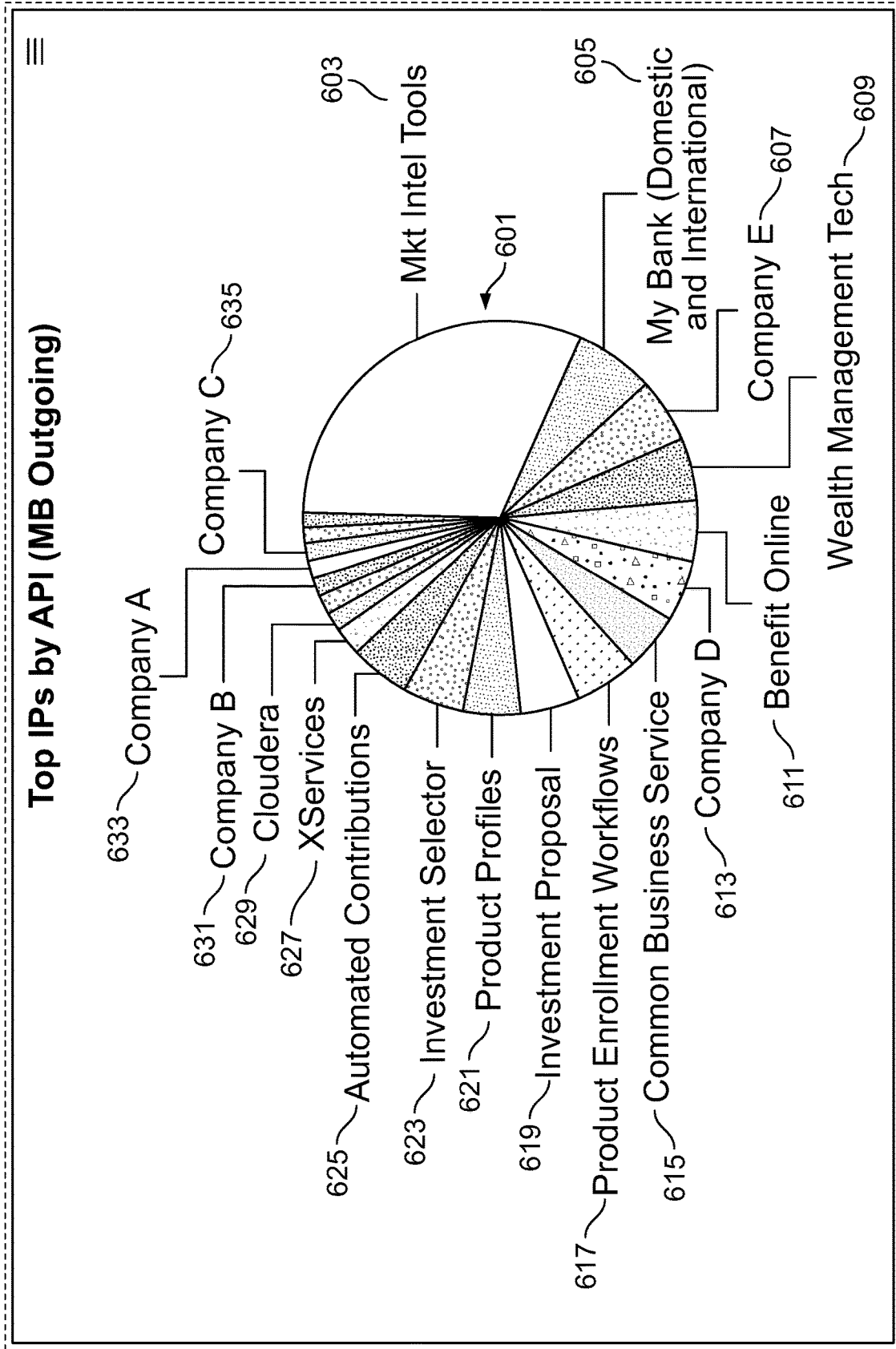
FIG. 6 shows an illustrative graphical user interface in accordance with principles of the disclosure.

FIG. 6 shows an illustrative graphical user interface ("GUI") that may be generated by the proxy server and, in some embodiments, the remediation framework. The illustrative GUI includes pie chart 601 illustrating IP addresses, grouped by APIs, that have generated the most outgoing megabytes of data through a system such as a proxy server. The pie chart shows that Mkt Intel Tools 603 has generated the most outgoing data, followed, in descending order, by My Bank (Domestic and International) 605, Company E 607, Wealth Management Tech 609, Benefit Online 611, Company D 613, Common Business Service 615, Product Enrollment Workflows 617, Investment Proposal 619, Product Profiles 621, Investment Sector 623, Automated Contributions 625, XServices 627, Cloudera 629, Company B 631, Company A 633 and Company C 635.

FIG. 7 shows illustrative GUI 700 in accordance with the disclosure. GUI 700 may display to a user a chart, filtered by Total Bytes in 711, of different URLs 709.

GUI 700 displays 10 entries of applications that were called during a 30-day time period. GUI 700 lists, in descending order, the URLs based on the total megabytes of data that were received from these URLs during the time period. Each URL may be a 'call', referred to alternately herein as an 'HTTP request'. For example, api.morningstar, com' may be an illustrative API call. For each URL, GUI 700 lists an identifying number of Host 705 that originated the call to the URL, a Category 707 associated with the URL in the proxy server, URL 709, Total Bytes in 711 and Total Bytes Out 713.

FIG. 8 shows illustrative GUI 800 in accordance with the disclosure. GUI 800 may be displayed to a user after a user selects the URL 'api.morningstar.com' in GUI 700. GUI 800 shows, for each application that called the URL 'api.morningstart.com', Host name 803 identifying a name of a server from which the URL call originated, Score 805, User(s) 807, Usage Comments 811, MB Received 813, Environment 815, MB sent 817, Internal Identification Number 817, and Application Owner 821. Host name 803 may display a server identification number, assigned to the server that is running the application.

For example, GUI 800 shows that Host 209.67.48.4, which is associated with user zs3fy81, received 74.74 megabytes from the URL 'api.morningstar.com' and sent 8.14 MB to the URL 'api.morningstar.com' during the 30-day time period. Host 209.67.48.4 is associated with a production environment and has been assigned Internal Identification Number 70680. John Doe is listed as application owner.

Score 805 may represent a value assigned to the server based on the remediation framework calculating the value for the server. The value may be calculated using the first, second, third, fourth, and fifth weights, where each weight is the value '1'. Here, Host 209.67.48.4 has been assigned the highest tallied score of '5'.

FIG. 8 shows that a server may run one or more authorized applications. Host 209.67.48.4 runs an authorized application associated with internal identification number 70690, but Host 216.35.62.140 runs six authorized applications, the internal identification numbers of the six applications being 23168, 25872, 27814, 38764, 41788 and 94173. A central registry may store information relating to each of the internal identification numbers, and store data relating to the applications associated with each of the identification numbers.

The score may be calculated for each HTTP request generated by a server. The score illustrated in FIG. 8 may be the most recent score assigned to the server for the URL call. In some embodiments, each identical external URL call may be assigned the same value. In some embodiments, the scoring algorithm used to calculate the value may include a metric for a frequency of a call generated by the server. In these embodiments, the score may vary for two or more identical URL calls generated by a server.

Figure 9:
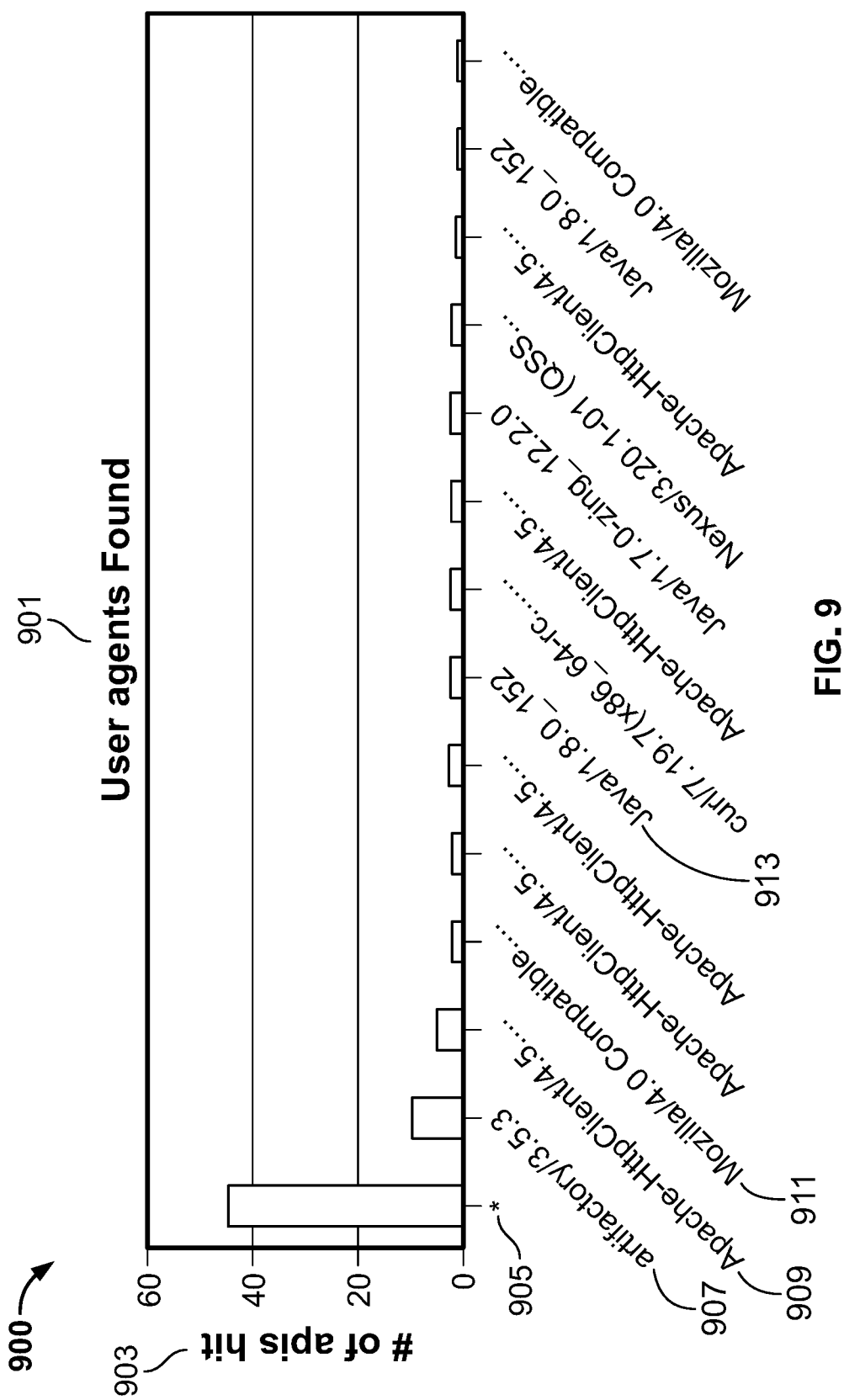
FIG. 9 shows an illustrative graphical user interface in accordance with principles of the disclosure.

FIG. 9 shows illustrative GUI 900 in accordance with the disclosure. GUI 900 illustrates a plurality of user agents that called 'api.morningstar.com' during the 30-days' time period.

The Y-axis of GUI 900 illustrates Number of APIs Hit 903. Number of APIs Hit 903 illustrates a number of calls that each of the agents illustrated in the X-axis executed to call api.morningstar.com. The X-axis lists agents called that api.morningstar.com' during the 30-days' time period.

Star 905 shows that the user agent that executed the largest number of calls to api.morningstar.com' does not have a user name. This indicates that the user agent associated with Star 905 is most probably an application, not an end user. User agents 911 and 913 are associated with user names that include the names of web browsers ("Mozilla and Java"). Thus, calls generated by User Agents 911 and 913 are likely being generated by an end user. User agent 909's name identifies user agent 909 as most probably being a program.

Figure 10:
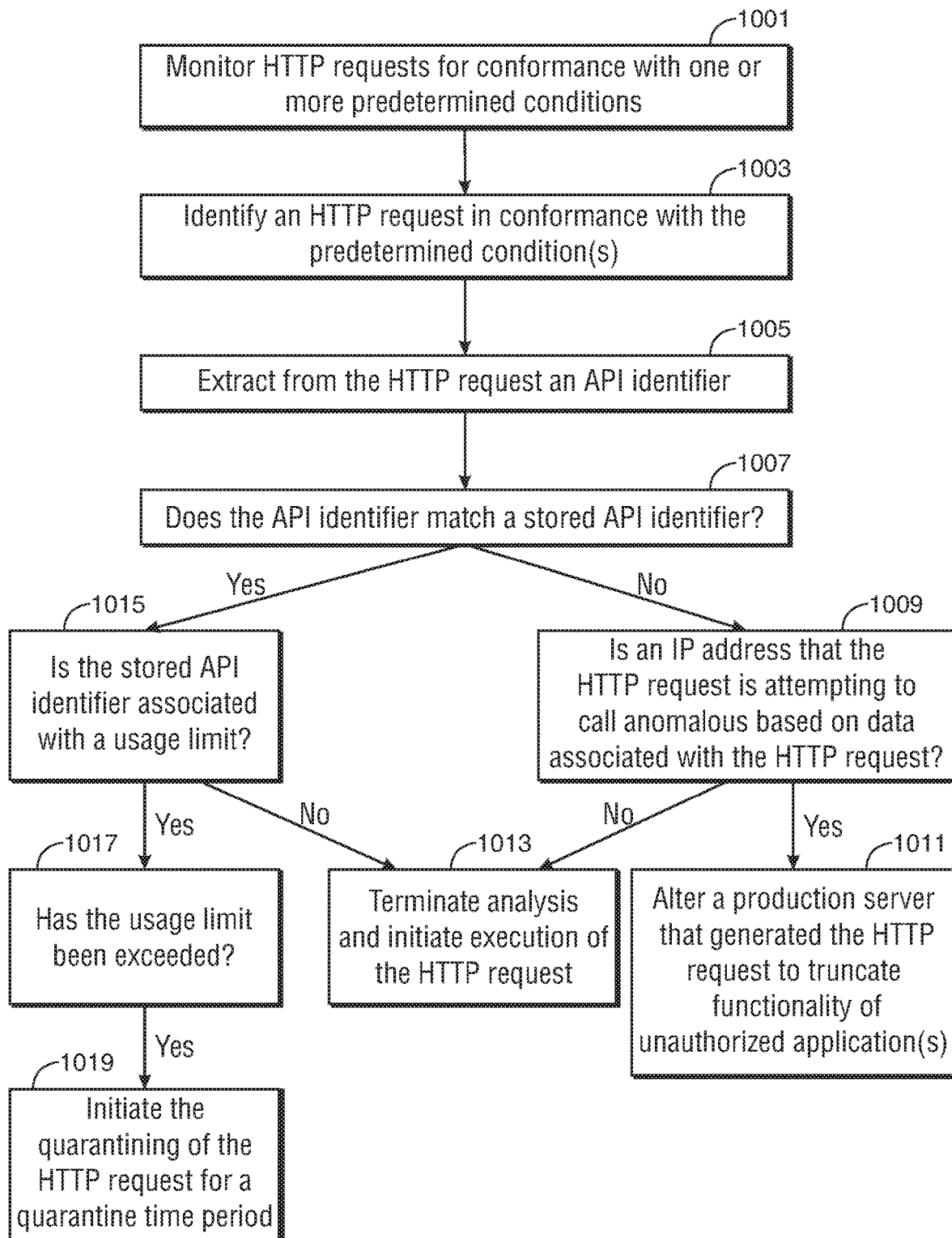
FIG. 10 shows an exemplary method in accordance with principles of the disclosure.

FIG. 10 shows an illustrative method in accordance with the disclosure. The method may be executed by the remediation framework. Although the method illustrated in FIG. 10 is described as being executed by the remediation framework, some or all the method may be executed by the proxy server.

At step 1001, the remediation framework may monitor HTTP requests for conformance with one or more predetermined conditions. The predetermined conditions may include satisfying one or more conditions such as: including an IP address listing a predefined term; being identified as originating from a production server; being associated with an account ID that identifies a service account; being either associated with a user agent that identifies a program or is not associated with any user name; and/or being associated with an identification number that, in a central registry, identifies a production application. In some embodiments, step 1001 may include, additionally or alternately, assigning weighted values to the HTTP request and determining, for each HTTP request, if a tallied weight exceeds a threshold value. The weighted values may be any weighted values disclosed herein.

At step 1003, the remediation framework may identify an HTTP request in conformance with the predetermined condition(s). When step 1001 includes assigning a weighted value to HTTP requests, step 1003 may include, additionally or alternatively, identifying an HTTP requests with a tallied weight exceeding a threshold value.

At step 1005, the remediation framework may extract from the HTTP request an API identifier. In some of these embodiments, the predetermined condition(s) may include the HTTP request requesting to access an IP address including an API identifier, such as the term 'API', in the IP address.

At step 1007, the remediation framework may determine whether or not the API identifier matches a stored API identifier. The stored API identifier may be stored in a database.

When the API identifier does not match a stored API identifier, the remediation framework, at step 1009, may determine whether or not an IP address that the HTTP request is attempting to call is anomalous based on data associated with the HTTP request. The data associated with the HTTP request may be stored in the proxy server. The determination of whether or not the IP address is anomalous may be executed as detailed herein.

When the IP address is determined to be anomalous, the remediation framework, at step 1011, may alter a production server that generated the HTTP request to truncate functionality of unauthorized applications that may be potentially running on the production server. The altering of the production server may include altering the production server to be a modified production server and additional remedial action detailed herein.

When the IP address is determined not to be anomalous, the remediation framework, at step 1013, may terminate analysis of the HTTP request an initiate the execution of the HTTP request. In some embodiments, the remediation framework may initiate the execution of the HTTP request by instructing a proxy server which received the HTTP request to fire the HTTP request.

When the API identifier matches a stored API identifier, the remediation framework, at step 1015, may determine if the stored API identifier is associated with a usage limit. The usage limit may be a maximum number of calls that may be permitted to be made to an API associated with the API identifier during a SLA time period. The usage limit may be a maximum number of bytes that may be uploaded from an API associated with the API identifier during a SLA time period.

After the remediation framework determines that the usage limit has not been exceeded, the remediation framework may execute step 1013 detailed above. After the remediation framework determines that the usage limit has been exceeded, the remediation framework, at step 1019, may initiate the quarantining of the HTTP request for a quarantine time period. Determining of whether or not a usage limit has been exceeded, and calculation of the quarantine time period, may be executed as described herein.

Figure 11:
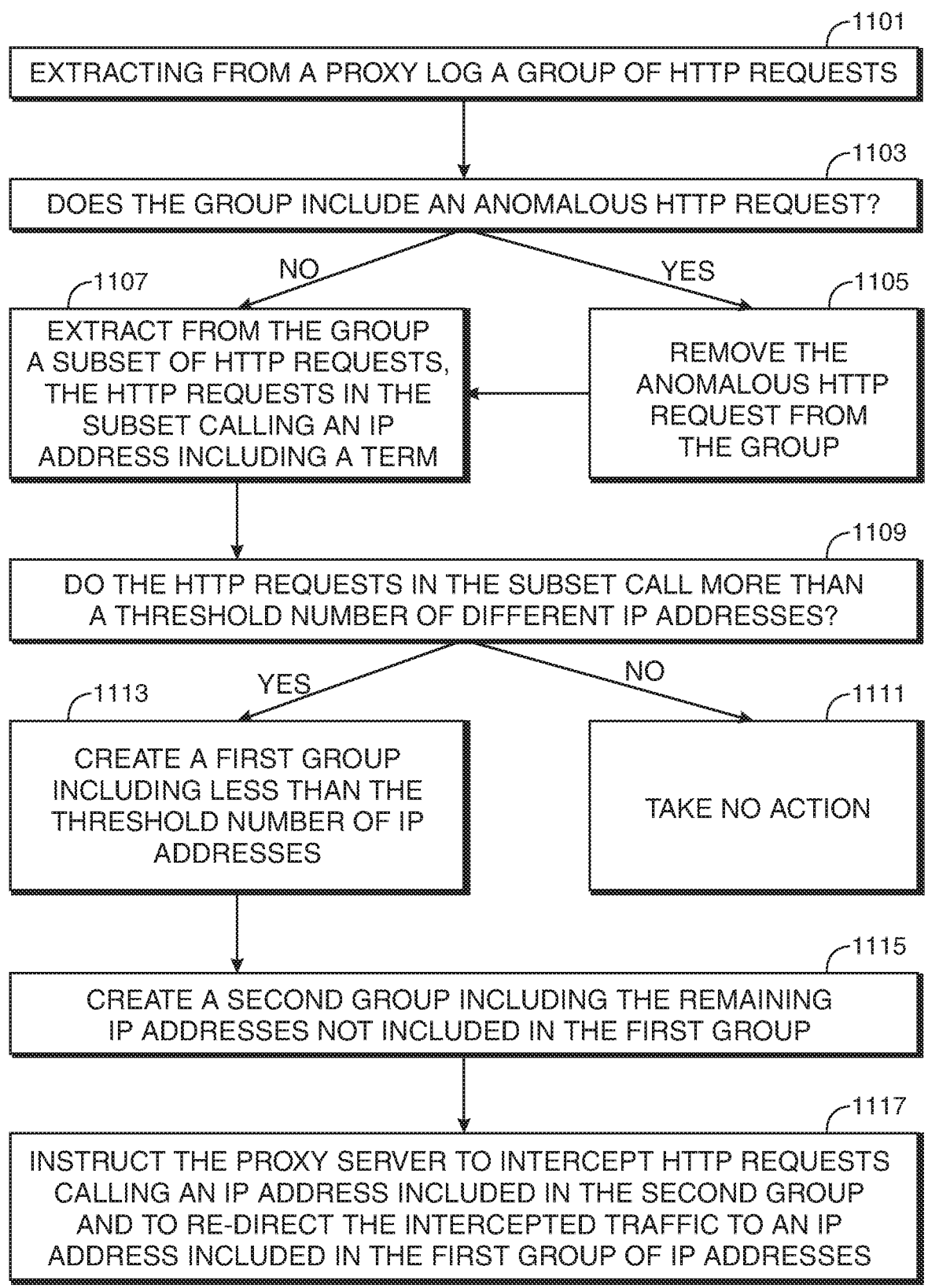
FIG. 11 shows an exemplary method in accordance with principles of the disclosure.

FIG. 11 shows an illustrative method in accordance with the disclosure. The method may be executed by the remediation framework. Some or all of the method may be executed by the proxy server.

At step 1101, the method may include extracting from a proxy log a group of HTTP requests. At step 1103, the method may include determining if the group includes an anomalous HTTP request. If an anomalous HTTP request is identified, the method may include, at step 1115, removing the anomalous HTTP request from the group. After the removing of the anomalous HTTP request, the method may continue at step 1107.

If an anomalous HTTP request is not identified, the method may include, at step 1107, extracting from the group a subset of HTTP requests. The HTTP requests in the subset may be HTTP requests calling an IP address including a term.

At step 1109, the method may include determining if the HTTP requests in the subset call more than a threshold number of different IP addresses.

If the HTTP requests in the subset are determined not to call more than the threshold number of different IP addresses the method may continue at step 1111. At 1111, no further action is taken.

If the HTTP requests in the subset are determined to call more than the threshold number of different IP addresses the method may continue at step 1113. At 1113, the method may include creating a first group including less than the threshold number of IP addresses. At step 1115, the method may include creating a second group including the remaining IP addresses not included in the first group. Methods for selecting IP addresses for including in the first group are described herein.

At step 1117, the method may include instructing the proxy server to intercept HTTP requests calling an IP address included in the second group and to re-direct the intercepted traffic to an IP address included in the first group of IP addresses.

Thus, methods and apparatus for OPTIMIZATION OF REDUNDANT USAGE PATTERNS BASED ON HISTORICAL DATA AND SECURITY CONSTRAINTS are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for quarantining shadow information technology ("IT") comprising one or more unauthorized applications running on a server and for optimizing network traffic and enhancing data security, the system comprising:
    a processor;
    a memory;
    a content-filtering web proxy server configured to filter HTTP requests and to store the HTTP requests and associated data in a proxy log;
    a remediation framework configured to extract from the proxy log a group of HTTP requests received by the proxy server, each of the HTTP requests in the group being identified, by the remediation framework as:
    including an IP address listing a predefined term;
    having originated from a production server;
    being associated with an account ID that identifies a service account;
    being associated with either a user agent that identifies a program or not associated with any user name; and
    being associated with an identification number that, in a central registry, identifies a production application;
    the remediation framework being further configured to identify an anomalous HTTP request in the group by:
    querying stored information associated with each of the identification numbers; and
    identifying an IP address associated with one of the HTTP requests in the group that is anomalous based on the stored information associated with the identification number;
    the remediation framework being configured to remove the anomalous HTTP request from the group to perform remedial action for the anomalous HTTP request, the remedial action including:
    accessing the production server from which the anomalous HTTP request originated;
    querying a directory to identify one or more authorized applications running on the production server from which the anomalous HTTP request originated;
    quarantining one or more unauthorized applications running on the production server from which the anomalous HTTP request originated by moving each of the identified authorized applications from the production server to a replacement server, wherein after the quarantining the production server has been altered to be a modified production server;
    creating a shadow account for accumulating third-party data requested by the modified production server and accumulating third-party data pushed to the modified production server; and
    transmitting to the proxy server instructions to take remedial action;
    the remediation framework being further configured to remove redundancies and enhance network performance by:
    extracting from the group a subset of HTTP requests, each of the HTTP requests in the subset calling an IP address including a term, the term not being a term associated with a programming language;
    when the HTTP requests in the subset are determined to be calling more than a threshold number of IP addresses, creating a first group including a predetermined number of IP addresses, the predetermined number being less than the threshold number, and a second group including the IP addresses not included in the first group; and
    instructing the proxy server to intercept HTTP requests calling an IP address included in the second group and to re-direct the intercepted traffic to an IP address included in the first group of IP addresses; and
    the proxy server for intercepting HTTP requests calling an IP address included in the second group and for re-directing the intercepted traffic to an IP address included in the first group of IP addresses.

2. The system of claim 1 wherein the proxy server is configured to execute the instructions received from the remediation framework to take remedial action by:
    terminating all third-party data transmission to the modified production server;
    redirecting to the shadow account all received third-party data directed to the modified production server;
    in response to receiving a new HTTP request from the modified production server, forwarding a copy of the HTTP request to the shadow account;
    executing the new HTTP request; and
    when a response to the new HTTP request is received, linking the response to the new HTTP request and transmitting the response and the new HTTP request to the shadow account;
wherein:
    completion, by the proxy server, of the remedial action truncates functionality of the one or more unauthorized applications running on the modified production server.

3. The system of claim 1 wherein:
    creation, by the remediation framework, of the first group includes identifying IP addresses for which a Service Level Agreement ("SLA") contract is in place with a company supporting the IP address;
    when the number of IP addresses for which an SLA contract is in place is less than the predetermined number, including each of the IP addresses for which an SLA contract is in place in the first group; and when the number of IP addresses for which an SLA contract is in place is greater than the predetermined number, ranking the IP addresses for which an SLA contract is in place based on the terms of the SLA contract, the terms including usage terms and conditions, and including in the first group the predetermined number of IP addresses, the IP addresses included in the group having the highest ranking.

4. The system of claim 3 wherein including an IP address in the second group includes automatically terminating an existing SLA with a company supporting the IP address.

5. The system of claim 3 wherein, in the event that an IP address in the first group is supported by a company for which no Service Level Agreement ("SLA") is in place, automatically generating a request to a company representative to establish a contract with the company supporting the IP address.

6. The system of claim 1 further comprising:
the remediation server being configured to instruct the proxy server, upon the lapse of a predetermined time period, to block all HTTP requests calling an IP address included in the second group; and
the proxy server being configured to block all HTTP requests calling an IP address included in the second group in response to receipt of the instructions from the remediation server.

7. The system of claim 1 wherein:
the term is selected from a list of predefined terms, the predefined terms including the terms 'weather', 'stock', 'temperature' and 'forecast'; and
the term does not include the term 'API', 'www', and '.com' and '.org'.

8. The system of claim 1, when the anomalous HTTP request is a first anomalous HTTP request, wherein:
the remediation framework is configured to identify a second anomalous HTTP request, the identification of the second anomalous HTTP request including the remediation framework performing an initial analysis including an initial filtering of the HTTP requests included in the group prior to the extracting from the group the subset of HTTP requests, the analysis comprising, for each HTTP request included in the group:
extracting from each HTTP request included in the group an API identifier;
querying a database to determine if the API identifier matches a stored API identifier;
when the API identifier matches a stored API identifier, retrieving from the database a usage limit including a maximum number of calls, including the API identifier, permitted to be generated during a service level agreement ("SLA") time period;
extracting from the proxy log a first HTTP request associated with a first timestamp and a second HTTP request associated with a second timestamp wherein:
the first HTTP request is a most-recently fired HTTP request including the API identifier; and
a number of HTTP requests including the API identifier that were fired during a duration extending between, and including, the first timestamp the second timestamp is equal to the maximum number of calls;
when a period of time extending between a current time and the second timestamp is greater than the SLA time period, truncating the initial analysis of the HTTP request; and when the period of time is less than the SLA time period, tagging the HTTP request as a second anomalous HTTP request and transmitting to the proxy server a set of instructions to remove the second anomalous HTTP request from the group and to temporarily quarantine the second anomalous HTTP request for a quarantine time period, the quarantine time period being an absolute difference between a first unit of time, defined by the SLA time period, and a second unit of time spanning between the first timestamp and the second timestamp; and
the proxy server is configured to, in response to the receipt of the set of instructions, quarantine the second anomalous HTTP request and, upon the lapse of the quarantine time period, fire the second anomalous HTTP request.

9. The system of claim 8 wherein, when the API identifier is associated with an unlimited usage limit, the remediation framework is configured to terminate the initial analysis.

10. The system of claim 8 wherein the set of instructions includes instructions to quarantine, during the quarantine time period, any additional HTTP requests received by the proxy server that include the API identifier.

11. The system of claim 2 wherein the proxy server is further configured to execute the instructions received from the remediation framework to take remedial action by:
applying a first dynamic filter to data the modified production server attempts to transmit to a third-party, the applying dynamic filter comprising:
receiving data from the modified production server for being transmitted to an IP address;
filtering the data for sensitive information;
when the data is determined to contain sensitive information:
transmitting the data to the shadow account; and
transmitting instructions to the remediation framework to shut down the modified production server;
when a size of the received data is greater than a predetermined size:
transmitting the data to the shadow account; and
transmitting instructions to the remediation framework to shut down the modified production server;
applying a second dynamic filter to third-party data transmitted to the modified production server, the second dynamic filter including:
receiving data from an IP address for transmission to the modified production server; and
if a size of the data is greater than a predetermined size:
transmitting the data to the shadow account; and
transmitting instructions to the remediation framework to shut down the modified production server.

12. The system of claim 3 wherein the extracting from the proxy log the group of HTTP requests includes the remediation framework calculating a value for the HTTP requests included in the proxy log, the calculating comprising, for each HTTP request included in the proxy log:
assigning a first weight to the HTTP request if the HTTP request, in the proxy log, requests to access an IP address including a predefined term;
assigning a second weight to the HTTP request if the HTTP request, in the proxy log, is identified as originating from a production server;
assigning a third weight to the HTTP request if the HTTP request, in the proxy log, is associated with an account ID that identifies a service account;
assigning a fourth weight to the HTTP request if the HTTP request, in the proxy log, is either associated with a user agent that identifies a program or is not associated with any user name;

assigning a fifth weight to the HTTP request if the HTTP request, in the proxy log, is associated with an identification number that, in a central registry, identifies a production application; and tallying the weights assigned to the HTTP request;

wherein:

when the tallied weight of the HTTP request is above a threshold value, the remediation framework is triggered to extract the HTTP request from the proxy log and include the HTTP request in the group;

when the tallied weight is below the threshold value, the remediation framework does not extract the HTTP request from the proxy log for inclusion in the group; and the tallied weight of the HTTP request is above the threshold value when the HTTP request:
- includes an IP address listing a predefined term;
- is identified as originating from a production server;
- is associated with an account ID that identifies a service account;
- is either associated with a user agent that identifies a program or is not associated with any user name; and
- is associated with an identification number that, in a central registry, identifies a production application.

13. A system for quarantining shadow information technology ("IT") comprising one or more unauthorized applications running on a server and for optimizing network traffic and enhancing data security, the system comprising:

a processor;

a memory;

a content-filtering web proxy server configured to filter HTTP requests and to store the HTTP requests and associated data in a proxy log;

a remediation framework configured to extract from the proxy log a group of HTTP requests received by the proxy server, each of the HTTP requests in the group being identified, by the remediation framework as:
- including an IP address listing a predefined term;
- having originated from a production server;
- being associated with an account ID that identifies a service account;
- being associated with either a user agent that identifies a program or not associated with any user name; and
- being associated with an identification number that, in a central registry, identifies a production application;

the remediation framework being further configured to identify an anomalous HTTP request in the group by:
- querying stored information associated with each of the identification numbers;
- identifying an IP address associated with one of the HTTP requests in the group that is anomalous based on the stored information associated with the identification number; and
- removing the anomalous HTTP request from the group;

the remediation framework is further triggered to perform remedial action for the anomalous HTTP request, the remedial action including:

determining if the production server from which the anomalous HTTP request originated is assigned to a first tier of importance or a second tier of importance;

when the production server is determined to be assigned to a first tier of importance, the remediation framework is configured to:
instruct the proxy server to increase monitoring of data being sent to, and received from, the production server;

when the production server is determined to be assigned to a second tier of importance, the second tier of importance being less than the first tier of importance, the remediation framework is configured to:
- access the production server from which the anomalous HTTP request originated;
- query a directory to identify one or more authorized applications running on the production server;
- quarantine one or more unauthorized applications running on the production server by moving each of the identified authorized applications from the production server to a replacement server, wherein after the quarantining the production server has been altered to be a modified production server;
- create a shadow account for accumulating third-party data requested by the modified production server and accumulating third-party data pushed to the modified production server; and
- instruct the proxy server to take remedial action;

the remediation framework being further configured to remove redundancies and enhance network performance by:
- extracting from the group a subset of HTTP requests, each of the HTTP requests in the subset calling an IP address including a term, the term not being a term associated with a programming language;
- when the HTTP requests in the subset are determined to be calling four or more different IP addresses, creating a first group including three or less IP addresses and a second group including one or more IP addresses; and
- instructing the proxy server to:
  - intercept HTTP requests calling an IP address included in the second group and to re-direct the intercepted traffic to an IP address included in the first group of IP addresses; and
  - upon the lapse of a predetermined time period, block all HTTP requests calling an IP address included in the second group; and the proxy server for:
- intercepting HTTP requests calling an IP address included in the second group and for re-directing the intercepted traffic to an IP address included in the first group of IP addresses; and
- the proxy server being configured to block all HTTP requests calling an IP address included in the second group upon the lapse of the predetermined time period.

14. The system of claim 13 wherein, in response to receipt of instructions from the production server to take remedial action, the proxy server is configured to implement the remedial action by:

firing the HTTP request;

terminating all third-party data transmission to the modified production server;

redirecting to the shadow account all received third-party data directed to the modified production server;

in response to receiving a new HTTP request from the modified production server, forwarding a copy of the HTTP request to the shadow account;

executing the new HTTP request; and when a response to the new HTTP request is received, linking the response to the new HTTP request and transmitting the response and the new HTTP request to the shadow account; wherein:

completion, by the proxy server, of the remedial action truncates functionality of the one or more unauthorized applications running on the modified production server.

15. The system of claim 14 wherein:

the first tier of importance includes a first permitted downtime and the second tier of importance includes a second permitted downtime longer than the first permitted downtime; and when the production server is determined to be assigned to the first tier of importance, the remediation framework is further configured to instruct the proxy server to:

continually monitor a size of outgoing traffic from the production server for a data extrusion event; and in response to detection of the data extrusion event, shut down the production server; and the proxy server, in response to receipt of the instructions from the production server, is configured to:

continually monitor the size of outgoing traffic from the production server for the data extrusion event; and shut down the production server in response to determining that a size of outgoing traffic is greater than a predetermined threshold, the determination identifying the data extrusion event.

16. The system of claim 14, when the anomalous HTTP request is a first anomalous HTTP request, wherein:

the remediation framework is configured to identify a second anomalous HTTP request, the identification of the second anomalous HTTP request including the remediation framework performing an initial analysis including an initial filtering of the HTTP requests included in the group prior to the extracting from the group the subset of HTTP requests, the analysis comprising for each HTTP request included in the group:

extracting from each HTTP request an API identifier;

querying a database to determine if the API identifier matches a stored API identifier;

when the API identifier matches a stored API identifier, retrieving from the database a usage limit including a maximum number of bytes which may be uploaded from a website including the API identifier during a service level agreement ("SLA") time period;

compiling, based on data stored in the proxy log, a volume of data received from IP addresses including the API identifier during the SLA time period;

when the compiled volume is less than the maximum number of bytes, truncating the initial analysis of the HTTP request and transmitting to the proxy server a first set of instructions to fire the HTTP request;

when the complied volume is greater than the maximum number of bytes:

tagging the HTTP request as a second anomalous HTTP request;

iteratively compiling bytes received from IP addresses including the API identifier in sequential order beginning with a most-recent transmission of bytes and tagging a transmission from an IP address whose byte volume, when added to the iteratively complied bytes, sets the value of compiled bytes to meet or exceed the maximum number;

transmitting to the proxy server a second set of instructions to remove the second anomalous HTTP request from the group and to temporarily quarantine the second anomalous HTTP request for a quarantine time period, the quarantine time period being an absolute difference between a first unit of time, defined by the SLA time period, and a second unit of time spanning between a timestamp of the most-recent transmission of bytes and a timestamp associated with the tagged transmission; and the proxy server is configured to, in response to receipt of the set of instructions, quarantine the second anomalous HTTP request and, upon the lapse of the quarantine time period, fire the second anomalous HTTP request.

17. A method for quarantining shadow information technology ("IT") comprising one or more unauthorized applications running on a server and for optimizing network traffic and enhancing data security, the method comprising:

filtering, using a content-filtering web proxy server, HTTP requests and storing the HTTP requests and associated data in a proxy log;

extracting, from the proxy log, using the remediation framework, a group of HTTP requests received by the proxy server, each of the HTTP requests in the group being identified, by the remediation framework as:

including an IP address listing a predefined term;

having originated from a production server;

being associated with an account ID that identifies a service account;

being associated with either a user agent that identifies a program or not associated with any user name; and being associated with an identification number that, in a central registry, identifies a production application;

identifying, using the remediation framework, an anomalous HTTP request in the group by:

querying stored information associated with each of the identification numbers; and identifying an IP address associated with one of the HTTP requests in the group that is anomalous based on the stored information associated with the identification number;

removing, using the remediation framework, the anomalous HTTP request from the group to perform remedial action for the anomalous HTTP request, the remedial action including:

accessing the production server from which the anomalous HTTP request originated;

querying a directory to identify one or more authorized applications running on the production server from which the anomalous HTTP request originated;

quarantining one or more unauthorized applications running on the production server from which the anomalous HTTP request originated by moving each of the identified authorized applications from the production server to a replacement server, wherein after the quarantining the production server has been altered to be a modified production server;

creating a shadow account for accumulating third-party data requested by the modified production server and accumulating third-party data pushed to the modified production server; and transmitting to the proxy server instructions to take remedial action;

removing redundancies and enhance network performance by the remediation framework performing the steps of:

extracting from the group a subset of HTTP requests, each of the HTTP requests in the subset calling an IP address including a term, the term not being a term associated with a programming language;

when the HTTP requests in the subset are determined to be calling four or more different IP addresses, creating a first group including three or less IP addresses and a second group including one or more IP addresses; and instructing the proxy server to intercept HTTP requests calling an IP address included in the second group and to re-direct the intercepted traffic to an IP address included in the first group of IP addresses; and using the proxy server, intercepting traffic directed the second group of IP addresses and re-directing the intercepted traffic to an IP address included in the first group of IP addresses.

18. The method of claim 17 further comprising the proxy server being configured to perform remedial action in response to receipt of instructions from the remediation framework, the remedial action including the proxy server performing the method steps of:

terminating all third-party data transmission to the modified production server;

redirecting to the shadow account all received third-party data directed to the modified production server;

in response to receiving a new HTTP request from the modified production server, forwarding a copy of the HTTP request to the shadow account;

executing the new HTTP request; and when a response to the new HTTP request is received, linking the response to the new HTTP request and transmitting the response and the new HTTP request to the shadow account;

wherein:

the completion, by the proxy server, of the method steps performing the remedial action truncates functionality of the one or more unauthorized applications running on the modified production server.

19. The method of claim 18 further comprising the proxy server performing the method steps of implementing the remedial action by applying a dynamic filter to data the modified production server attempts to transmit to a third-party, the applying the dynamic filter comprising the method steps of:

receiving data from the modified production server for being transmitted to an IP address;

filtering the data for sensitive information; and when the data is determined to contain sensitive information:

transmitting the data to the shadow account; and transmitting instructions to the remediation framework to shut down the modified production server.

20. The method of claim 19, when the dynamic filter is a first dynamic filter, further comprising implementing the remedial action, using the proxy server, by applying a second dynamic filter to third-party data transmitted to the modified production server, the applying the second dynamic filter including the method steps of:

receiving data from an IP address for transmission to the modified production server; and if a size of the data is greater than a predetermined size:

transmitting the data to the shadow account; and transmitting instructions to the remediation framework to shut down the modified production server.

* * * * *